(12) United States Patent
Zhang et al.

(10) Patent No.: US 11,541,318 B2
(45) Date of Patent: Jan. 3, 2023

(54) METHOD AND APPARATUS FOR BREEDING VIRTUAL PET

(71) Applicant: Tencent Technology (Shenzhen) Company Limited, Guangdong (CN)

(72) Inventors: Yicheng Zhang, Guangdong (CN); Wei Peng, Guangdong (CN); Yanhou Lin, Guangdong (CN); Xingcai Jiang, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 291 days.

(21) Appl. No.: 17/018,364

(22) Filed: Sep. 11, 2020

(65) Prior Publication Data
US 2020/0406149 A1    Dec. 31, 2020

Related U.S. Application Data

(63) Continuation of application No. PCT/CN2019/094158, filed on Jul. 1, 2019.

(30) Foreign Application Priority Data

Aug. 24, 2018   (CN) .......................... 201810973797.1

(51) Int. Cl.
  *A63F 13/825*   (2014.01)
  *A63F 13/58*    (2014.01)
(52) U.S. Cl.
  CPC ............ *A63F 13/825* (2014.09); *A63F 13/58* (2014.09); *A63F 2300/65* (2013.01); *A63F 2300/8058* (2013.01)
(58) Field of Classification Search
  CPC .... A63F 13/825; A63F 13/58; A63F 2300/65; A63F 2300/8058
  See application file for complete search history.

(56) References Cited

U.S. PATENT DOCUMENTS

| 8,920,243 B1 | 12/2014 | Curtis et al. |
| 2001/0011034 A1* | 8/2001 | Sogabe ................... A63F 13/10 463/9 |

(Continued)

FOREIGN PATENT DOCUMENTS

| CN | 1462939 A | 12/2003 |
| CN | 102043613 A | 5/2011 |

(Continued)

OTHER PUBLICATIONS

"Blockchain-game case studies"; downloaded from the Internet on Sep. 10, 2020 at http://www.100ec.cn/detail--6445808.html; eight pages.
"CryptoKitties"; downloaded from the Internet on Sep. 10, 2020 at http://ethfans.org/ajian1984/articles/720; ten pages.
"CryptoKitties"; downloaded from the Internet on Sep. 10, 2020 at https://new.gq.com/omn/20171206/20171206AQXHQ6.html; nine pages.

(Continued)

*Primary Examiner* — Thomas H Henry
(74) *Attorney, Agent, or Firm* — Crowell & Moring LLP

(57) ABSTRACT

A method for breeding a virtual pet is provided, including: displaying a mating market interface, the mating market interface including virtual pets in a mating state; selecting a paternal virtual pet from the virtual pets in the mating state via the mating market interface according to a first operation; displaying a pet breeding interface, the pet breeding interface including a paternal pet field and a maternal pet field, and the paternal virtual pet having a first pet image being displayed in the paternal pet field; adding a maternal virtual pet having a second pet image to the maternal pet field according to a second operation; and displaying a breeding result interface comprising a filial virtual pet when breeding succeeds, the filial virtual pet having a third pet image generated based on a genetic inheritance rule according to the first pet image and the second pet image.

14 Claims, 15 Drawing Sheets

(56) References Cited

U.S. PATENT DOCUMENTS

| | | | | |
|---|---|---|---|---|
| 2008/0268930 A1* | 10/2008 | Miller | ............... | A63F 13/10 |
| | | | | 463/6 |
| 2014/0114630 A1* | 4/2014 | Brave | ............... | G06F 30/20 |
| | | | | 345/420 |
| 2018/0126284 A1 | 5/2018 | Tarng et al. | | |
| 2020/0184041 A1* | 6/2020 | Andon | ............... | A63F 13/60 |

FOREIGN PATENT DOCUMENTS

| | | |
|---|---|---|
| CN | 103077230 A | 5/2013 |
| CN | 109107166 A | 1/2019 |
| JP | 10-222051 | 8/1998 |
| JP | 11-126017 | 5/1999 |
| JP | 2001-212370 | 8/2001 |
| JP | 2002139987 A | 5/2002 |
| JP | 2014-8266 | 1/2014 |
| KR | 20010045273 A | 6/2001 |
| KR | 20010057829 A | 7/2001 |
| KR | 10-2014-0004559 | 1/2014 |

OTHER PUBLICATIONS

"CryptoKitties"; downloaded from the Internet on Sep. 10, 2020 at http://www.360doc.com/content/18/0313/11/30724179 736598810.shtml; three pages.
International Search Report and Written Opinion dated Sep. 29, 2019 for PCT Application No. PCT/CN2019/094158, ten pages.
First Office Action dated Dec. 27, 2019 for Chinese Patent Application No. 201810973797.1.
Second Office Action dated Jun. 23, 2020 for Chinese Patent Application No. 201810973797.1.
Office Action issued on Japanese application 2020-568985 on Feb. 8, 2022, 4 pages.
Translation of Japanese office action 2020-568985, 8 pages.
Notice of Preliminary Rejection issued in Korean application 10-2020-7033230 dated Aug. 22, 2022, 12 pages.
Office Action issued on Japanese application 2020-568985 dated Sep. 20, 2022, 4 pages.
English translation of Japanese office action.
https://crypto.watch.impress.co.jp/docs/news/1130053.html.

* cited by examiner

METHOD AND APPARATUS FOR BREEDING VIRTUAL PET

RELATED APPLICATION

This application is a continuation application of the International PCT Application No. PCT/CN2019/094158, filed with the China National Intellectual Property Administration, PRC on Jul. 1, 2019 which claims priority to Chinese Patent Application No. 201810973797.1, entitled "METHOD AND APPARATUS FOR BREEDING VIRTUAL PET, DEVICE, AND STORAGE MEDIUM" and filed with the China National Intellectual Property Administration, PRC on Aug. 24, 2018, which are incorporated herein by reference in their entireties.

FIELD OF THE TECHNOLOGY

Embodiments of this disclosure relate to the field of computer graphics, and in particular, to a method, an apparatus, a device, and a storage medium for breeding a virtual pet.

BACKGROUND OF THE DISCLOSURE

Some clients are provided with virtual pets, and the virtual pets may have various animal images or cartoon images.

A player may obtain a new virtual pet in a breeding manner. In the related art, a paternal virtual pet and a maternal virtual pet own respective value attribute parameters, and the value attribute parameters include at least one of a life value, a fighting power, a defense value, a health point, a pet level, and a happiness value. When the paternal virtual pet and the maternal virtual pet mate and breed a filial virtual pet (i.e., child virtual pet), adjustment is performed based on parental value attribute parameters, to obtain value attribute parameters of the filial virtual pet, thereby generating the filial virtual pet. For example, if the paternal virtual pet is phoenix A having fighting power 10000 and a defense value 8000; and the maternal virtual pet is phoenix B having fighting power 8000 and a defense value 10000, the filial virtual pet may be phoenix C having fighting power 10000 and a defense value 10000.

The manner of breeding by adjusting value attribute parameters may be applicable to only a game client with a fighting system but inapplicable to other types of game clients, and consequently has a limited application range.

SUMMARY

In some implementations, a method for breeding a virtual pet is disclosed. The method may be performed by a terminal. The terminal may be provided with virtual pets, and at least one pet image of each of the virtual pets may be generated based on a genetic rule. The method may include:

displaying a mating market interface, the mating market interface including virtual pets in a mating state;

selecting a paternal virtual pet from the virtual pets in the mating state via the mating market interface according to a first operation;

displaying a pet breeding interface, the pet breeding interface including a paternal pet field and a maternal pet field, the paternal virtual pet being displayed in the paternal pet field, the paternal virtual pet being a virtual pet provided by a first user account on a mating market, and the paternal virtual pet having a first pet image;

adding a maternal virtual pet to the maternal pet field according to a second operation, the maternal virtual pet being a virtual pet owned by a second user account logging in to the terminal, and the maternal virtual pet having a second pet image; and displaying a breeding result interface comprising a filial virtual pet when breeding succeeds, the filial virtual pet having a third pet image generated based on a genetic inheritance rule according to the first pet image and the second pet image.

In some other implementations, a method for breeding a virtual pet is disclosed. The method may be performed by a terminal. The terminal may be provided with virtual pets, and at least one pet image of each of the virtual pets being generated based on a genetic rule. The method may include:

displaying a mating setting interface of a paternal virtual pet, the mating setting interface being used for releasing the paternal virtual pet to a setting interface of a mating market;

obtaining a mating resource quantity of the paternal virtual pet from the mating setting interface; and displaying a mating market interface, the mating market interface comprising the paternal virtual pet in a mating state, and the paternal virtual pet being used for breeding with a maternal virtual pet owned by a second user account to obtain a filial virtual pet, wherein:

the paternal virtual pet has a first pet image, the maternal virtual pet has a second pet image, and a third pet image of the filial virtual pet is generated based on a genetic inheritance rule according to the first pet image and the second pet image.

In some other implementations, a method for breeding a virtual pet is disclosed. The method may be performed by a server. The method may include:

receiving a breeding request transmitted by a terminal, the breeding request carrying information about a paternal virtual pet and information about a maternal virtual pet, the paternal virtual pet being a virtual pet provided by a first user account on a mating market, the maternal virtual pet being a virtual pet owned by a second user account logging in to the terminal, the paternal virtual pet having a first pet image, and the maternal virtual pet having a second pet image;

generating a third pet image of a filial virtual pet based on an inheritance rule according to the first pet image of the paternal virtual pet and the second pet image of the maternal virtual pet; and transmitting information about the filial virtual pet to the terminal, the terminal being configured to display a breeding result interface according to the information about the filial virtual pet, and the third pet image of the filial virtual pet being displayed on the breeding result interface.

In some other implementations, an apparatus for breeding a virtual pet is disclosed. The apparatus may be provided with virtual pets, and at least one pet image of each of the virtual pets being generated based on a genetic rule. The apparatus may include:

a first display module, configured to display a mating market interface, the mating market interface including virtual pets in a mating state; and a first interaction module, configured to select a paternal virtual pet from the mating market interface according to a first operation, the first display module being configured to display a pet breeding interface, the pet breeding interface including a paternal pet field and a maternal pet field, the paternal virtual pet being displayed in the paternal pet field, the paternal virtual pet being a virtual pet provided by a first user account on a mating market, and the paternal virtual pet having a first pet image;

the first interaction module being configured to add a maternal virtual pet to the maternal pet field according to a second operation, the maternal virtual pet being a virtual pet owned by a second user account logging in to the terminal, and the maternal virtual pet having a second pet image; and the first display module being configured to display a breeding result interface if breeding succeeds, a filial virtual pet being displayed on the breeding result interface, the filial virtual pet having a third pet image, and the third pet image being generated based on the genetic inheritance rule according to the first pet image and the second pet image.

In some other implementations, an apparatus for breeding a virtual pet is disclosed. The apparatus may be provided with virtual pets, and at least one pet image of each of the virtual pets being generated based on a genetic inheritance rule. The apparatus may include:

a second display module, configured to display a mating setting interface of a paternal virtual pet, the mating setting interface being used for releasing the paternal virtual pet to a setting interface of a mating market; and a second interaction module, configured to obtain a mating resource quantity of the paternal virtual pet from the mating setting interface, the second display module being configured to display a mating market interface, the mating market interface including the paternal virtual pet in a mating state, and the paternal virtual pet being used for breeding with a maternal virtual pet owned by a second user account to obtain a filial virtual pet, the paternal virtual pet having a first pet image, the maternal virtual pet having a second pet image, and a third pet image of the filial virtual pet being generated based on the genetic inheritance rule according to the first pet image and the second pet image.

In some other implementations, an apparatus for breeding a virtual pet is disclosed. The apparatus may include:

a third receiving module, configured to receive a breeding request transmitted by a terminal, the breeding request carrying information about a paternal virtual pet and information about a maternal virtual pet, the paternal virtual pet being a virtual pet provided by a first user account on a mating market, the maternal virtual pet being a virtual pet owned by a second user account logging in to the terminal, the paternal virtual pet having a first pet image, and the maternal virtual pet having a second pet image;

a generating module, configured to generate a third pet image of a filial virtual pet based on an inheritance rule according to the first pet image of the paternal virtual pet and the second pet image of the maternal virtual pet; and a third transmission module, configured to transmit information about the filial virtual pet to the terminal, the terminal being configured to display a breeding result interface according to the information about the filial virtual pet, and the third pet image of the filial virtual pet being displayed on the breeding result interface.

In some other implementations, an apparatus for breeding a virtual pet is disclosed. The apparatus may be provided with virtual pets, and at least one pet image of each of the virtual pets may be generated based on a genetic inheritance rule. The apparatus may include a memory for storing computer instructions and a processor in communication with the memory. The processor, when executing the instructions, may be configured to cause the apparatus to:

display a mating market interface, the mating market interface comprising virtual pets in a mating state;

select a paternal virtual pet from the virtual pets in the mating state via the mating market interface according to a first operation;

display a pet breeding interface, the pet breeding interface comprising a paternal pet field and a maternal pet field, the paternal virtual pet being displayed in the paternal pet field, the paternal virtual pet being a virtual pet provided by a first user account on a mating market, and the paternal virtual pet having a first pet image;

add a maternal virtual pet to the maternal pet field according to a second operation, the maternal virtual pet being a virtual pet owned by a second user account logging in to the apparatus, and the maternal virtual pet having a second pet image; and display a breeding result interface comprising a filial virtual pet when breeding succeeds, the filial virtual pet having a third pet image generated based on the genetic inheritance rule according to the first pet image and the second pet image.

In some other implementations, a terminal is disclosed. The terminal may include a memory and a processor and may be provided with virtual pets, and at least one pet image of each of the virtual pet being generated based on a genetic inheritance rule. The memory may store at least one computer-readable instruction. The at least one computer-readable instruction nay be loaded and executed by the processor to implement the following operations:

displaying a mating market interface, the mating market interface including virtual pets in a mating state;

selecting a paternal virtual pet from the mating market interface according to a first operation;

displaying a pet breeding interface, the pet breeding interface including a paternal pet field and a maternal pet field, the paternal virtual pet being displayed in the paternal pet field, the paternal virtual pet being a virtual pet provided by a first user account on a mating market, and the paternal virtual pet having a first pet image;

adding a maternal virtual pet to the maternal pet field according to a second operation, the maternal virtual pet being a virtual pet owned by a second user account logging in to the terminal, and the maternal virtual pet having a second pet image; and displaying a breeding result interface if breeding succeeds, a filial virtual pet being displayed on the breeding result interface, the filial virtual pet having a third pet image, and the third pet image being generated based on the genetic inheritance rule according to the first pet image and the second pet image.

In some other implementations, a terminal is disclosed. The terminal may include a memory and a processor. The terminal may be provided with virtual pets, and at least one pet image of each of the virtual pets may be generated based on a genetic inheritance rule. The memory stores at least one computer-readable instruction, and the at least one computer-readable instruction may be loaded and executed by the processor to implement the following operations:

displaying a mating setting interface of a paternal virtual pet, the mating setting interface being used for releasing the paternal virtual pet to a setting interface of a mating market;

obtaining a mating resource quantity of the paternal virtual pet from the mating setting interface; and displaying a mating market interface, the mating market interface including the paternal virtual pet in a mating state, and the paternal virtual pet being used for breeding with a maternal virtual pet owned by a second user account to obtain a filial virtual pet, the paternal virtual pet having a first pet image, the maternal virtual pet having a second pet image, and a third pet image of the filial virtual pet being generated based on the genetic inheritance rule according to the first pet image and the second pet image.

In some other implementations, a server is disclosed. The server may include a memory and a processor. The memory may store at least one computer-readable instruction, and the at least one computer-readable instruction may be loaded and executed by the processor to implement the following operations:

receiving a breeding request transmitted by a terminal, the breeding request carrying information about a paternal virtual pet and information about a maternal virtual pet, the paternal virtual pet being a virtual pet provided by a first user account on a mating market, the maternal virtual pet being a virtual pet owned by a second user account logging in to the terminal, the paternal virtual pet having a first pet image, and the maternal virtual pet having a second pet image;

generating a third pet image of a filial virtual pet based on an inheritance rule according to the first pet image of the paternal virtual pet and the second pet image of the maternal virtual pet; and transmitting information about the filial virtual pet to the terminal, the terminal being configured to display a breeding result interface according to the information about the filial virtual pet, and the third pet image of the filial virtual pet being displayed on the breeding result interface.

In some other implementations, a computer-readable non-transitory storage medium is disclosed for storing at least one computer-readable instruction. The at least one computer-readable instruction may be loaded and executed by a processor to implement the following operations:

displaying a mating market interface, the mating market interface including virtual pets in a mating state;

selecting a paternal virtual pet from the mating market interface according to a first operation;

displaying a pet breeding interface, the pet breeding interface including a paternal pet field and a maternal pet field, the paternal virtual pet being displayed in the paternal pet field, the paternal virtual pet being a virtual pet provided by a first user account on a mating market, and the paternal virtual pet having a first pet image;

adding a maternal virtual pet to the maternal pet field according to a second operation, the maternal virtual pet being a virtual pet owned by a second user account logging in to the terminal, and the maternal virtual pet having a second pet image; and displaying a breeding result interface if breeding succeeds, a filial virtual pet being displayed on the breeding result interface, the filial virtual pet having a third pet image, and the third pet image being generated based on a genetic inheritance rule according to the first pet image and the second pet image.

In some other implementations, a computer-readable non-transitory storage medium is disclosed for storing at least one computer-readable instruction. The at least one computer-readable instruction may be loaded and executed by a processor to implement the following operations:

displaying a mating setting interface of a paternal virtual pet, the mating setting interface being used for releasing the paternal virtual pet to a setting interface of a mating market;

obtaining a mating resource quantity of the paternal virtual pet from the mating setting interface; and displaying a mating market interface, the mating market interface including the paternal virtual pet in a mating state, and the paternal virtual pet being used for breeding with a maternal virtual pet owned by a second user account to obtain a filial virtual pet, the paternal virtual pet having a first pet image, the maternal virtual pet having a second pet image, and a third pet image of the filial virtual pet being generated based on the genetic inheritance rule according to the first pet image and the second pet image.

In some other implementations, a computer-readable non-transitory storage medium is disclosed for storing at least one computer-readable instruction. The at least one computer-readable instruction may be loaded and executed by a processor to implement the following operations:

receiving a breeding request transmitted by a terminal, the breeding request carrying information about a paternal virtual pet and information about a maternal virtual pet, the paternal virtual pet being a virtual pet provided by a first user account on a mating market, the maternal virtual pet being a virtual pet owned by a second user account logging in to the terminal, the paternal virtual pet having a first pet image, and the maternal virtual pet having a second pet image;

generating a third pet image of a filial virtual pet based on an inheritance rule according to the first pet image of the paternal virtual pet and the second pet image of the maternal virtual pet; and transmitting information about the filial virtual pet to the terminal, the terminal being configured to display a breeding result interface according to the information about the filial virtual pet, and the third pet image of the filial virtual pet being displayed on the breeding result interface.

BRIEF DESCRIPTION OF THE DRAWINGS

The following briefly introduces the accompanying drawings required for describing the embodiments. Apparently, the accompanying drawings in the following description show merely some embodiments of the present invention, and a person of ordinary skill in the technology may still derive other drawings from the accompanying drawings without creative efforts.

DESCRIPTION OF EMBODIMENTS

Figure 1:
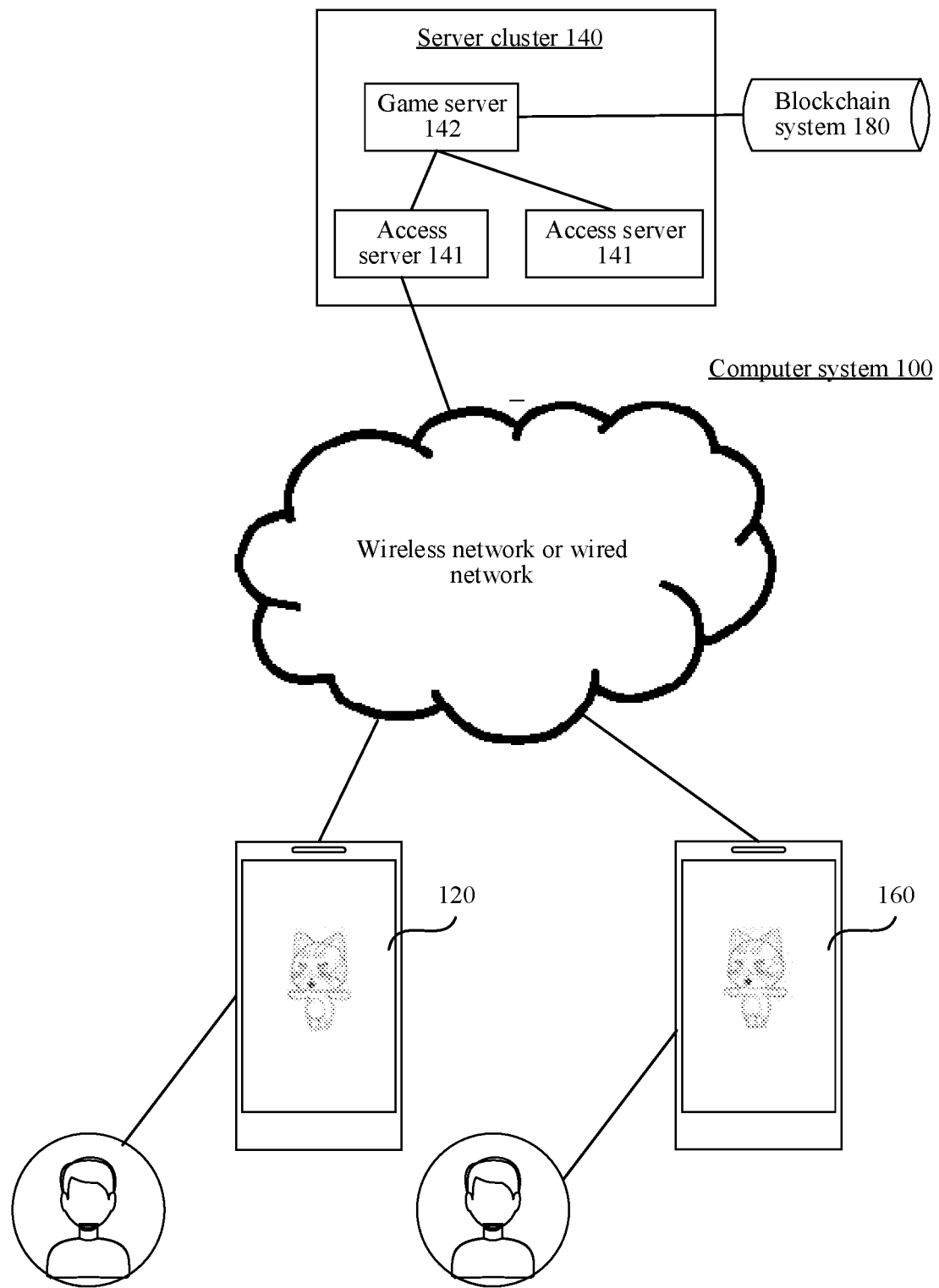
FIG. 1 is a structural block diagram of a computer system according to an exemplary embodiment of this disclosure.

To make the objectives, technical solutions, and advantages of embodiments of this application more comprehensible, the following further describes the embodiments of this application in detail with reference to the accompanying drawings.

Virtual pet: a digital pet presented as at least one pet image in a cartoon form and an animal form. The virtual pet includes a two-dimensional digital pet or a three-dimensional digital pet. For example, a virtual pet is a three-dimensional virtual pet presented as a pet image in the form of a cartoon cat. Optionally, there are some virtual pets whose pet images are generated randomly. For example, pet images of the 0th-generation virtual pets are generated randomly. There are some virtual pets whose pet images are generated according to a genetic inheritance rule based on pet images of parental virtual pets and/or other ancestral virtual pets. For example, a pet image of a descendant virtual pet other than the 0th-generation virtual pet is generated according to the genetic inheritance rule. Optionally, each virtual pet may have a unique gene sequence, and the gene sequence includes generation parameters for determining a pet image of the virtual pet. The gene sequence is also referred to as image parameters.

In some embodiments, pet information of each virtual pet is stored on a blockchain system, and is stored and authenticated through a consensus mechanism for a plurality of nodes on the blockchain system. The pet information at least includes a unique gene sequence of the virtual pet, and further optionally includes at least one of: identification information of the virtual pet, parent information of the virtual pet, generation information of the virtual pet, genealogy information of the virtual pet, historical transaction journal information of the virtual pet, historical career event information of the virtual pet or other information about the virtual pet. Because a gene sequence of each virtual pet is unique and information stored on a blockchain system is true and unique, a virtual pet has a collection attribute. Meanwhile, because pet information of a virtual pet is stored on a blockchain system, even if a virtual pet is a digital pet designed to be used in one application, the virtual pet may be conveniently migrated to another application.

In some embodiments, a virtual pet is a digital pet displayed by a client (or referred to as an application program) running on a terminal. The client includes at least one of the following functions: capturing a virtual pet, generating a virtual pet, breeding a virtual pet, trading a virtual pet, fighting by using a virtual pet, carrying out augmented reality (AR) interaction by using a virtual pet, carrying out social communication by using a virtual pet, and carrying out AR education by using a virtual pet. In some other embodiments, the client is a client for obtaining, breeding and/or trading a virtual pet based on a blockchain system. In some other embodiments, the client is a geolocation-based social networking game program and the social game program provides at least one function of performing collecting a virtual pet, growing virtual pet, and/or fighting by using a virtual pet.

In some embodiments, the client has a function of fighting by using a virtual pet. In this case, a gene sequence determines features of a virtual pet. The above-mentioned features may include: extrinsic features and/or intrinsic features.

Extrinsic features refer to features embodying a pet image of a virtual pet. Optionally, a virtual pet may include different body parts such as skin, speckles, ears, beards, patterns, eyes, and a mouth, and each of the body parts may have a variety of different extrinsic features. The extrinsic features may include visible features such as color, shape, texture and the like. For example, extrinsic features of skin may include different colors of white skin, red skin, orange skin, yellow skin, green skin, cyan skin, blue skin, purple skin and the like. In another example, extrinsic features of ears may include different shapes of long ears, short ears, rolled ears, folded ears, normal ears and the like.

Intrinsic features refer to features embodying intrinsic properties of a virtual pet. For example, intrinsic properties may include a variety of different properties such as an intelligence value, an attack power value, a defense power value, a dexterity value, a magic value, a strength value, an endurance value, an agility value, a potential value, a speed value, a health point and the like.

A gene sequence of a virtual pet: includes a set of parameter values used for generating a pet image of the virtual pet, and is also referred to as image parameters. Using the 3D virtual pet as an example, the pet image of each virtual pet includes a plurality of types of 3D image materials. The types of 3D image materials correspond to different role parts and/or texture levels. Each 3D image material corresponds to a material identifier. Each type of 3D material identifier can be considered as a parameter value in the gene sequence. For example, if 3D body models of a 3D virtual pet are the same, the pet image of the 3D virtual pet includes at least 8 types of 3D image materials (also referred to as local feature): 3D body model, ear model, skin material, eye material, nose material, mouth material, beard material, body speckle material, and chest and abdomen pattern material. Optionally, the pet image of the 3D virtual pet may further include: tail material, external pendant material, and global feature. The tail material is a feature for determining a tail model of the virtual pet. For example, when the pet has a tail, the tail material may be a long and thin tail or a short and thick tail. The external pendant material may be a feature for determining accessories of the virtual pet. The accessories include but are not limited to at least one of a backpack, glasses, handheld prop, belt, clothes, hat, shoes and head accessory. The global feature is an overall image feature for covering the body model of the virtual pet representing the virtual pet as a whole, and has the highest display priority. When target image parameters include the global feature, the global feature covers the local feature and is completely displayed, that is, the local feature is hidden and not displayed. For example, when a pet cat has a superman global feature, an image showing a cat is not displayed, instead a pet image with a superman appearance or a pet image with a robot appearance is displayed instead.

Correspondingly, the gene sequence includes at least one of a global feature parameter, a skin texture feature parameter, a skin color feature parameter, a belly texture feature parameter, a belly color feature parameter, an eye texture feature parameter, an eye color feature parameter, a mouth texture feature parameter, a mouth color feature parameter, a beard texture feature parameter, a beard color feature parameter, an ear feature parameter, a tail feature parameter, or a pendant feature parameter. The gene sequence may be represented by a plurality of key-value pairs arranged in order, and the key-value pairs can be in the form of (gene name, parameter value). For example, the gene sequence may be represented as Gene=[(3D body model feature, default), (skin feature, smooth), (belly feature, pattern 1), (mouth texture feature, small canine teeth 1), (mouth color feature, red), (tail feature, stubby shape)].

A genetic inheritance rule: also referred to as an inheritance rule, genetic algorithm, or genetic inheritance algorithm, is a rule of handing down pet images of parental virtual pets and/or other ancestral virtual pets by imitating a genetic law of real creatures to generate a pet image of a filial virtual pet. In some embodiments, to ensure that each virtual pet is a unique customized virtual pet, each virtual pet has a unique gene sequence. In some embodiments, the genetic inheritance rule is a rule of recombining and de-duplicating pet images of parental virtual pets and/or other ancestral virtual pets according to the genetic law to generate a pet image with a unique feature of a filial virtual pet. Deduplication refers to a mechanism of regenerating, when a same gene sequence as that of an existing virtual pet appears in a genetic process, a gene sequence of the virtual pet thereby ensuring genetic uniqueness of the virtual pet. Optionally, because the genetic inheritance rule imitates the genetic rule of real creatures, there are further restrictions in the breeding process, such as duration of pregnancy and forbidding breeding of close relatives.

In this embodiment of this disclosure, there are genetic genes between two virtual pets with a genetic relationship. Genetic genes refer to genes handed down from one of two virtual pets with a genetic relationship to the other. Features determined by genetic genes can be referred to as genetic features. Two virtual pets with a genetic relationship have same genetic features, that is, have same image material features. For example, two virtual pets with a genetic relationship both have yellow skin. In another example, two virtual pets with a genetic relationship both have red skin and folded ears. There may be one or more genetic features, which is not limited in this embodiment of this disclosure.

Usually, the closer the generations between two virtual pets with a genetic relationship are, the more genetic features there are; conversely, the farther the generations between two virtual pets with a genetic relationship are, the fewer genetic features there are.

Generation information of a virtual pet: refers to generation information of the virtual pet in the entire virtual pet world, which is determined by generations of a paternal virtual pet and a maternal virtual pet of the virtual pet. In some embodiments, the generation of a filial virtual pet is obtained by adding one to the maximum generation number of the paternal virtual pet and the maternal virtual pet. For example, if the paternal virtual pet is a $0^{th}$-generation virtual pet and the maternal virtual pet is a $4^{th}$-generation virtual pet, the filial virtual pet is a $5^{th}$-generation virtual pet. In some embodiments, the generation of a $0^{th}$-generation virtual pet is the lowest (oldest). For example, the generation of the zeroth-generation virtual pet is 0. The generation of a non-zeroth-generation virtual pet is determined by generations of the parental virtual pets thereof. The generation of the filial virtual pet bred and generated by the parental virtual pets is higher than those of the parental virtual pets thereof. In one implementation, if only parental virtual pets of a same generation are allowed to breed and generate a filial virtual pet (that is, next-generation virtual pet), the generation of the filial virtual pet is equal to the generation of the parental virtual pets plus 1. For example, if the generations of the parental virtual pets are both 1, the generation of the filial virtual pet is 2. In another example, if the generations of the parental virtual pets are both 0, the generation of the filial virtual pet is 1. In another example, if parental virtual pets of different generations are also allowed to breed and generate a filial virtual pet, the generation of the filial virtual pet is equal to the generation of one of parental virtual pets with the higher generation plus 1. For example, when the generation of the paternal virtual pet is 0 and the generation of the maternal virtual pet is 2, the generation of the filial virtual pet is 3. In addition, the zeroth-generation virtual pet is not bred and generated by the paternal virtual pet and the maternal virtual pet, but is automatically generated by a virtual pet system. Therefore, the zeroth-generation virtual pet does not have a paternal virtual pet or a maternal virtual pet, and there are no other virtual pets that may be in earlier generations than that of the zeroth-generation virtual pet.

FIG. 1 is a structural block diagram of a computer system 100 according to an exemplary embodiment of this disclosure. The computer system 100 includes: a first terminal 120, a server cluster 140 comprising at least one server, and a second terminal 160.

The first terminal 120 is connected to the server cluster 140 by using a wireless network or wired network. The first terminal 120 may be at least one of a smartphone, a game console, a desktop computer, a tablet computer, an e-book reader, an MP3 player, an MP4 player or a laptop portable computer. A client supporting a virtual pet is installed and run on the first terminal 120. The client may be any program supporting pet breeding, including an AR game program, and an AR education program. The first terminal 120 is a terminal used by a first user, and a first user account logs in to the client running in the first terminal 120.

The first terminal 120 is connected to the server cluster 140 by using a wireless network or wired network.

The server cluster 140 includes at least one of one server, a plurality of servers, a cloud computing platform and a virtualization center. The server cluster 140 is configured to provide a backend service for the client supporting a virtual pet. Optionally, the server cluster 140 is responsible for primary computing work, and the first terminal 120 and the second terminal 160 are responsible for secondary computing work; or the server cluster 140 is responsible for secondary computing work, and the first terminal 120 and the second terminal 160 are responsible for primary computing work; or the server cluster 140, the first terminal 120 and the second terminal 160 perform collaborative computing by using a distributed computing architecture.

Optionally, the server cluster 140 includes: an access server 141 and a game server 142. The access server 141 is configured to provide an access service and an information receiving/transmitting service for the first terminal 120 and the second terminal 160, and forward useful information between a terminal and the game server 142. The game server 142 is configured to provide the backend service for the client, such as, at least one of a game logic service, a material providing service, a virtual pet generating service, a virtual pet trading service, and a virtual pet breeding service. There may be one or more game servers 142. When there are a plurality of game servers 142, there are at least two game servers 142 configured to provide different services, and/or there are at least two game servers 142 configured to provide the same service. This is not limited in this embodiment of this disclosure.

A client supporting a virtual pet is installed and run in the second terminal 160. The client may be any program including an AR game program, and an AR education program. The second terminal 160 is a terminal used by a second user. A second user account logs in to the client running on the second terminal 120.

Optionally, the first user account and the second user account may be in the same virtual social network. Optionally, the first user account and the second user account may belong to the same team or the same organization, have a friend relationship or have communication permission. Optionally, the first user account and the second user account may alternatively belong to different teams, different organizations, or two hostile groups.

Optionally, the clients installed on the first terminal 120 and the second terminal 160 are the same, or the clients installed on the two terminals are the same type of clients running on different control system platforms. The client includes at least one of the following functions: capturing a virtual pet, generating a virtual pet, breeding a virtual pet, trading a virtual pet, fighting by using a virtual pet, carrying out AR interaction, social communication, or AR education by using a virtual pet. In some other embodiments, the client may be a client for obtaining, breeding and/or trading a virtual pet based on a blockchain system. In some other embodiments, the client may be a geolocation-based social networking game program performing at least one of collecting a virtual pet, growing a virtual pet, and/or fighting by using a virtual pet.

The first terminal 120 may generally refer to one of a plurality of terminals, the second terminal 160 may generally refer to one of a plurality of terminals, and this embodiment is described only by using the first terminal 120 and the second terminal 160 as an example. Terminal types of the first terminal 120 and the second terminal 160 may be the same or different, and the terminal types include at least one of a smartphone, a game console, a desktop computer, a tablet computer, an e-book reader, an MP3 player, an MP4 player, or a laptop portable computer. The following embodiments are described by using a smartphone as a terminal.

A person skilled in the art may learn that, there may one or more terminals. The quantity or type of the terminals is not limited in this this disclosure.

Figure 2:
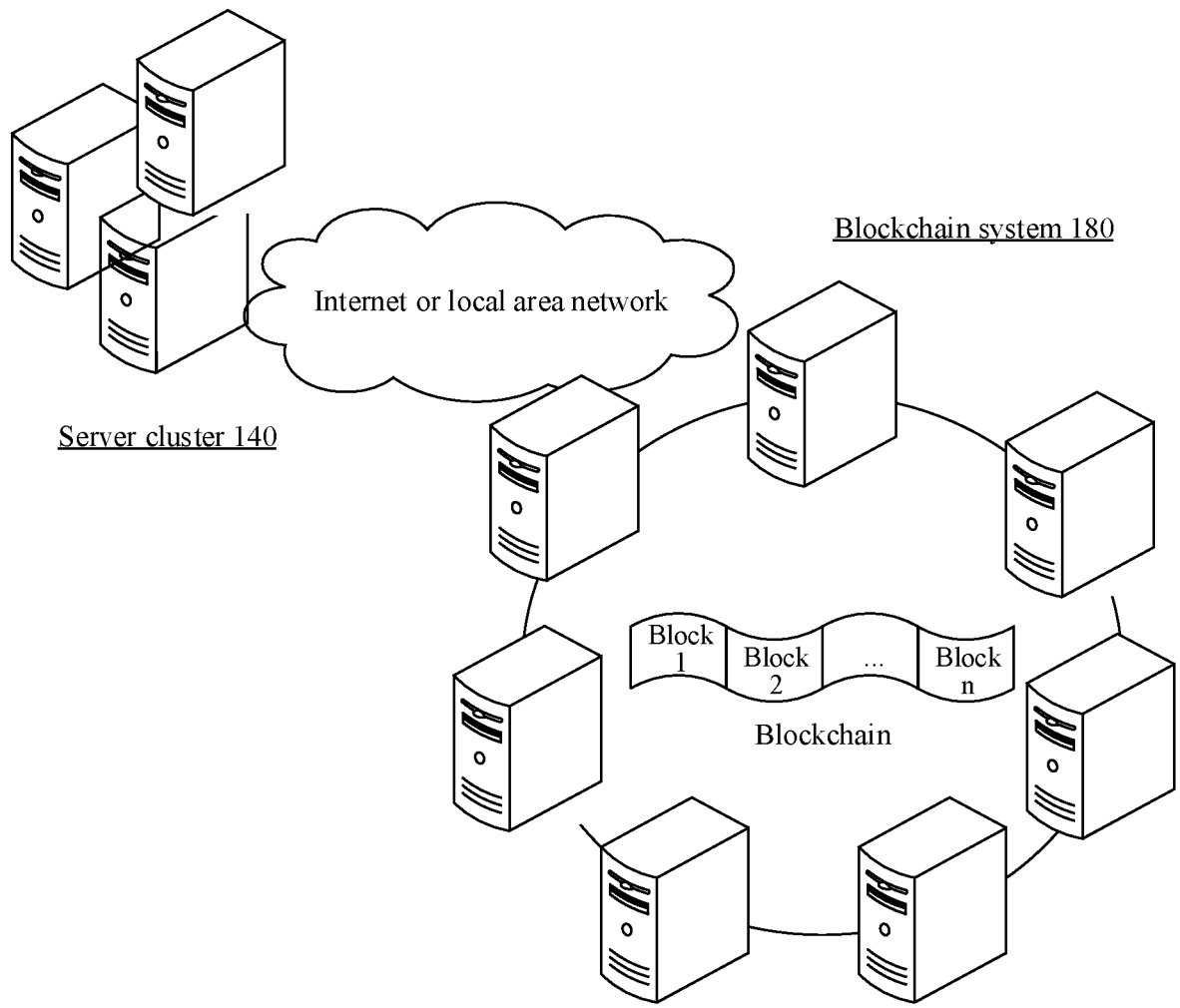
FIG. 2 is a structural block diagram of a server cluster according to an exemplary embodiment of this disclosure.

In some optional embodiments, the server cluster 140 may be configured to store role information and trading record of each virtual pet. The role information includes: at least one of a role identifier used for uniquely identifying the virtual pet, an image parameter used for representing a pet image of the virtual pet, and a preview used for representing the virtual pet. In an optional embodiment shown in FIG. 2, the server cluster 140 is further connected to a blockchain system 180, and the server cluster 140 stores the role information and/or trading record of each virtual pet in the blockchain system 180. In some optional embodiments, the server cluster 140 itself may alternatively be used as one node in the blockchain system 180 to run and store data.

Figure 3:
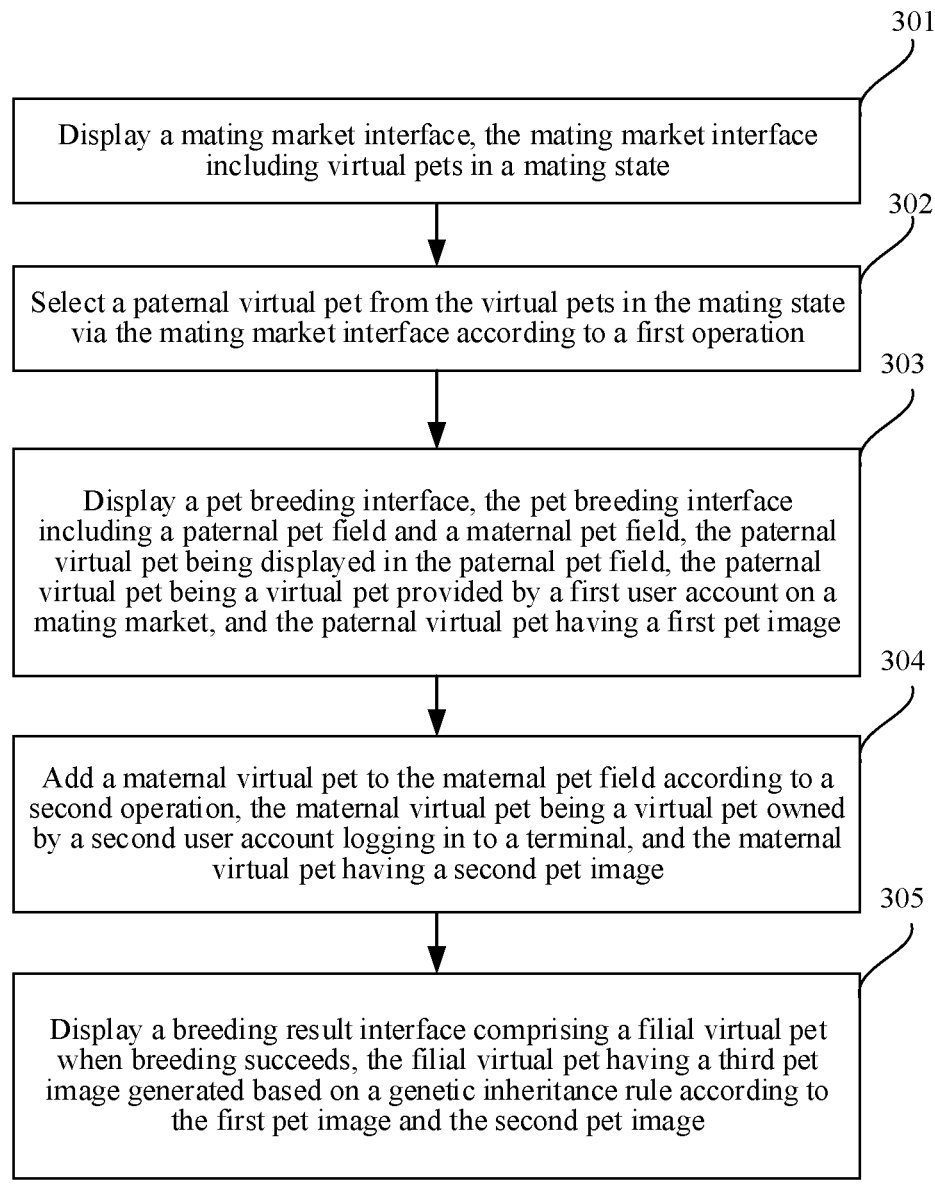
FIG. 3 is a flowchart of a method for breeding a virtual pet according to an exemplary embodiment of this disclosure.

FIG. 3 is a flowchart of a method for breeding a virtual pet according to an exemplary embodiment of this disclosure. This embodiment is described by using an example in which the method is applied to the second terminal 160 shown in FIG. 1. A client is run on the terminal, the client is provided with virtual pets, and at least one pet image of each of the virtual pets is generated based on a genetic inheritance rule. The method includes the following steps:

Step 301. Display a mating market interface, the mating market interface including virtual pets in a mating state.

The client is run on the terminal. A current user account logs in to the client. The client is configured with a function related to a virtual pet.

A user starts the client in the terminal, and turns on the mating market interface in the client. The mating market interface is used for displaying the virtual pets in the mating state. Optionally, different user accounts release virtual pets owned by the different user accounts to the mating market interface (i.e., list the virtual pets), to be selected by other user accounts.

Optionally, m (m is a positive integer) card areas are displayed on the mating market interface, and each card area is used for displaying one virtual pet in the mating state. At least one type of information of a nickname, an identifier, a two-dimensional pet image (or three-dimensional pet image), a genetic feature, and a mating price of the virtual pet may be displayed on the card area. Optionally, each virtual pet displayed in the mating market interface is a candidate paternal virtual pet.

Figure 4:
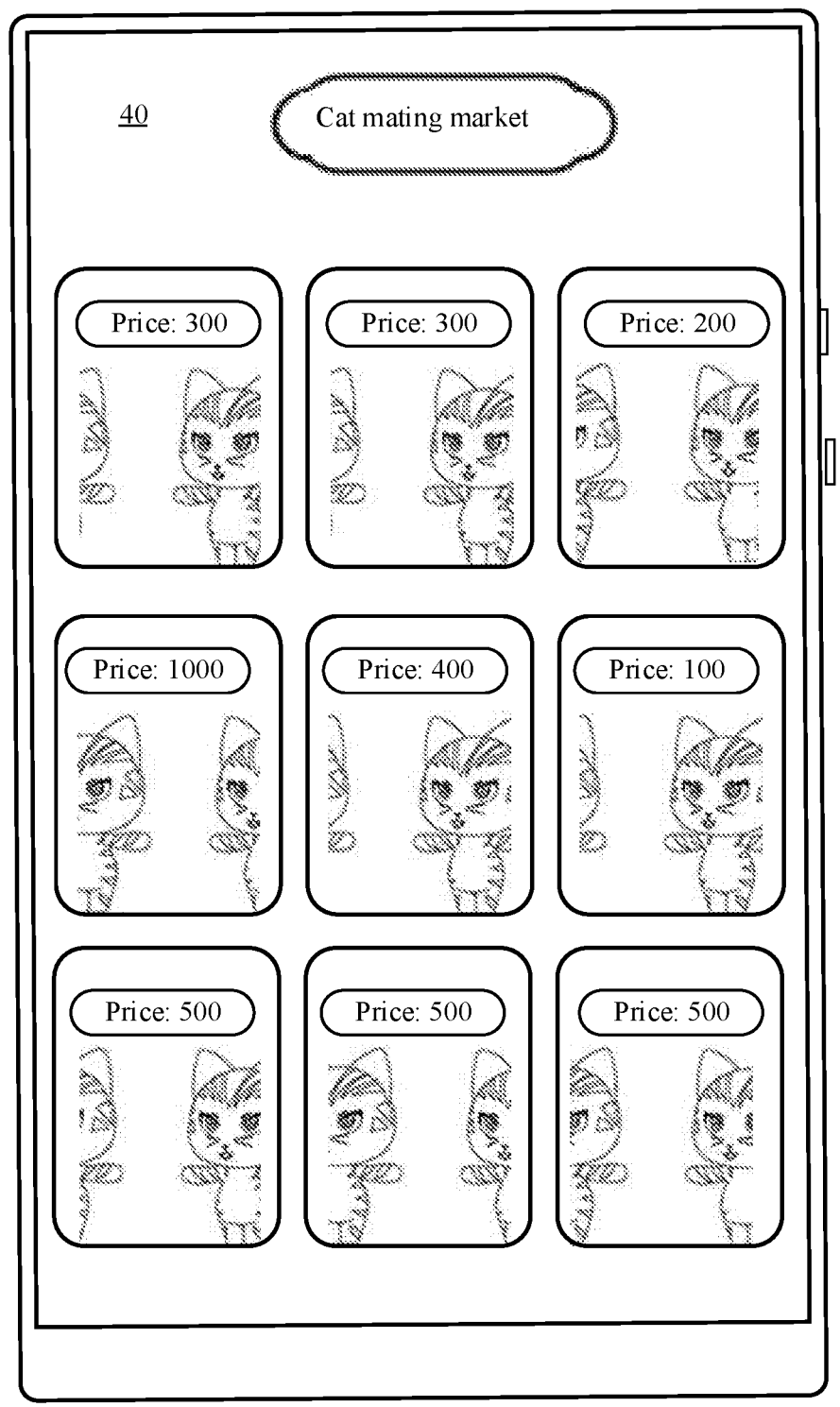
FIG. 4 is a schematic interface diagram of a mating cat market according to an exemplary embodiment of this disclosure.

Schematically, referring to FIG. 4, a mating market interface 40 with nine card areas is displayed on a terminal, and one virtual pet in a mating state is displayed on each card area. A two-dimensional preview and a mating price of the virtual pet are displayed on the card area.

Step 302. Select a paternal virtual pet from the mating market interface according to a first operation.

Optionally, the first operation may be an operation of activating a virtual pet on the mating market interface.

A user selects one virtual pet from the mating market interface as the paternal virtual pet. To make the selection, the user may select a virtual pet having some genetic features according to personal preference. For example, the user may select a virtual pet having a scarce global feature as the paternal virtual pet.

Step 303. Display a pet breeding interface, the pet breeding interface including a paternal pet field and a maternal pet field, the paternal virtual pet being displayed in the paternal pet field, the paternal virtual pet being a virtual pet provided by a first user account on a mating market, and the paternal virtual pet having a first pet image.

After the user selects the paternal virtual pet from the mating market interface, the terminal displays the pet breeding interface. The pet breeding interface is a user interface used for selecting a paternal virtual pet and a maternal virtual pet to breed a filial virtual pet. A paternal pet field and a maternal pet field are displayed on the pet breeding interface, and the paternal pet field is a control field used for selecting a virtual pet as a paternal role in the current breeding process. The maternal pet field is a control field used for selecting a virtual pet as a maternal role in the current breeding process.

Because the user has selected the paternal virtual pet from the mating market, the paternal virtual pet is displayed on the paternal pet field of the pet breeding interface. The paternal virtual pet is a virtual pet provided by the first user account on the mating market, and has the first pet image. The first pet image is an external image of the paternal virtual pet displayed in the client. The first pet image may be a three-dimensional pet image, and the three-dimensional pet image includes a plurality of three-dimensional image materials. Schematically, the three-dimensional pet image includes at least one image material of: a 3D body model, skin, speckles, patterns, ears, a nose, eyes, beards, a tail, a global feature, or an external pendant. The external pendant includes at least one of: a backpack, glasses, jewelry, a handheld prop, or a head accessory. Skin, speckles, patterns, ears, a nose, eyes, beards and a tail may be referred to as local features.

Figure 5:
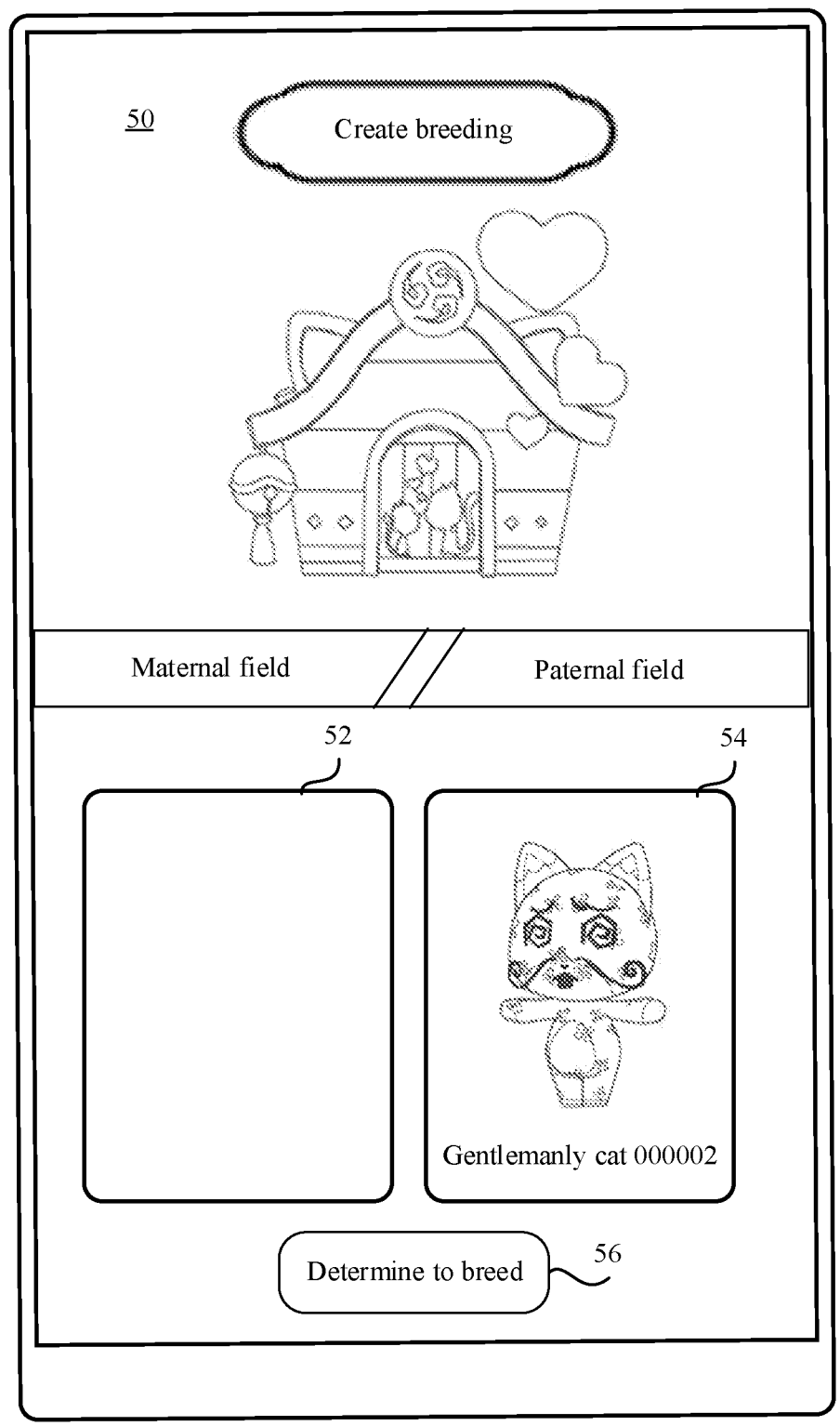
FIG. 5 is a schematic interface diagram of a pet breeding interface according to an exemplary embodiment of this disclosure.

Schematically, referring to FIG. 5, a pet breeding interface 50 is displayed on a terminal, and the pet breeding interface 50 includes a maternal pet field 52 and a paternal pet field 54. A paternal virtual pet "gentlemanly cat 000002" selected from a mating market is displayed on the paternal pet field 54. The paternal virtual pet "gentlemanly cat 000002" is provided by a first user account, and the paternal virtual pet has a unique three-dimensional pet image.

Step 304. Add a maternal virtual pet to the maternal pet field according to a second operation, the maternal virtual pet being a virtual pet owned by a second user account logging in to the terminal, and the maternal virtual pet having a second pet image.

Schematically, the terminal determines, according to the second operation, the maternal virtual pet in the current breeding process from a plurality of virtual pets owned by the second user account. The second user account is a user account currently logging in to the terminal.

Optionally, the maternal virtual pet has the second pet image. The second pet image is an external image of the maternal virtual pet displayed to the user in the client. The second pet image may be a three-dimensional pet image including a plurality of three-dimensional image materials. Schematically, the three-dimensional pet image includes at least one image material of a 3D body model, skin, speckles, patterns, ears, a nose, eyes, beards, a tail, a global feature, or an external pendant. The external pendant includes at least one of a backpack, glasses, jewelry, a handheld prop, or a head accessory. Skin, speckles, patterns, ears, a nose, eyes, beards and a tail may be referred to as local features.

Figure 6:
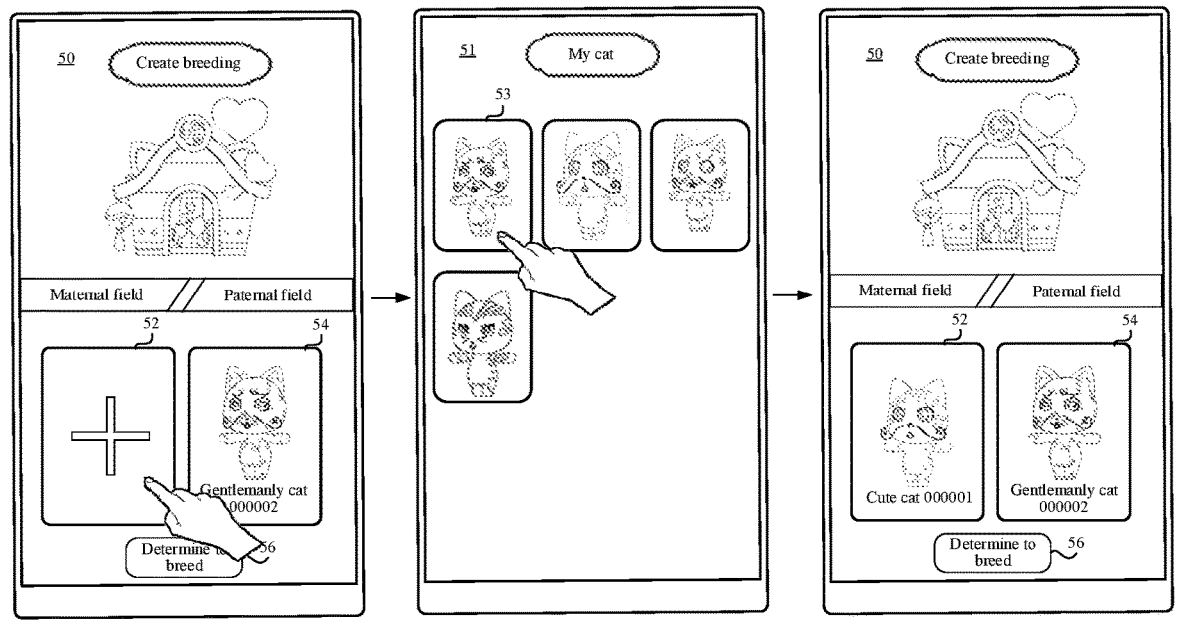
FIG. 6 is a schematic interface diagram of adding a maternal virtual pet according to an exemplary embodiment of this disclosure.

Schematically, referring to FIG. 6, a pet breeding interface 50 is displayed on a terminal, a user may tap a maternal pet field 52 as a triggering operation, and then the terminal switches according to the triggering operation to display a pet selection interface 51, where each virtual pet owned by a current user account is displayed on the pet selection interface 51. The user may tap a maternal virtual role 53 to select it, and the terminal adds the maternal virtual role 53 to the maternal pet field 52 according to the selection operation.

Optionally, a "determining to breed" button 56 is further displayed on the pet breeding interface 50. After a paternal virtual role and the maternal virtual role are selected, the user may tap the "determining to breed" button 56 to trigger a breeding signal. After receiving the confirmed breeding signal, the terminal transmits a breeding request to a server, where the breeding request includes information about a paternal virtual pet and information about a maternal virtual pet; and then, the terminal receives a breeding response of the server, the breeding response including information about a filial virtual pet such as an image parameter.

Step 305. Display a breeding result interface if breeding succeeds, a filial virtual pet being displayed on the breeding result interface, the filial virtual pet having a third pet image, and the third pet image being generated based on a genetic inheritance rule according to the first pet image and the second pet image.

Figure 7:
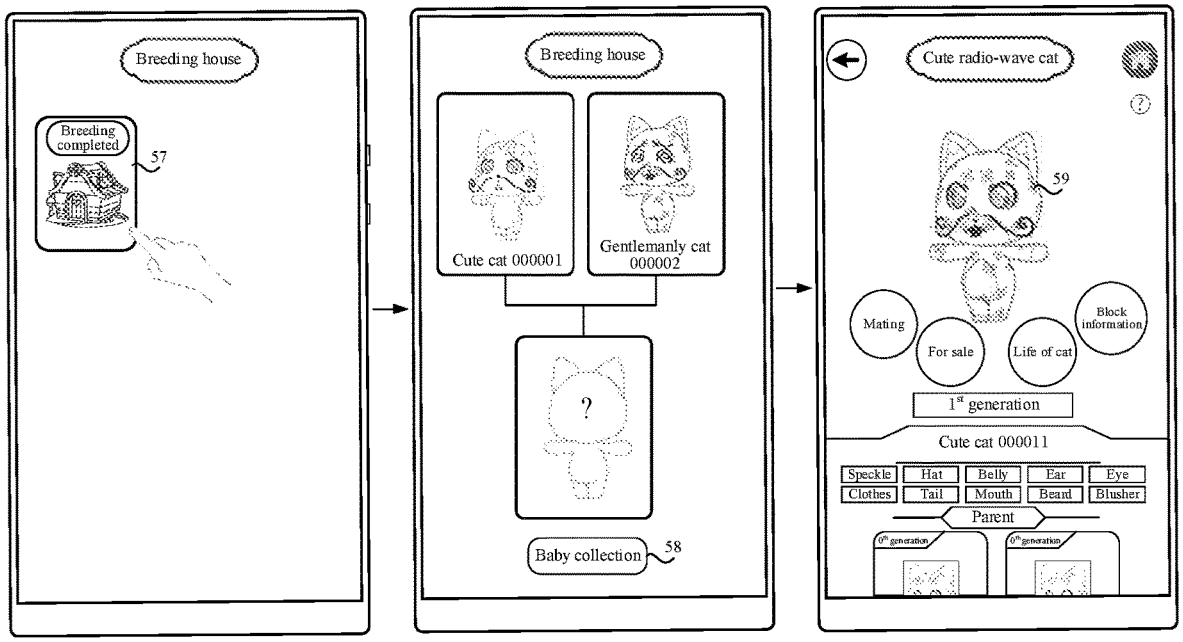
FIG. 7 is a schematic interface diagram of collecting a filial virtual pet according to another exemplary embodiment of this disclosure.

The terminal displays the breeding result interface if the current breeding succeeds. Optionally, a filial virtual pet 58 from the breeding is displayed on the breeding result interface, as shown in FIG. 7.

Optionally, the genetic inheritance rule includes a rule algorithm of generating the third pet image of the filial virtual pet based on a genetic inheritance law according to the first pet image of the paternal virtual pet and the second pet image of the maternal virtual pet.

Optionally, the genetic inheritance rule includes at least one of: a heredity rule, a mutation rule, or a loss rule.

The heredity rule includes that all or part of image materials of the third pet image of the filial virtual pet are replicated from the first pet image and/or the second pet image, and even may be further replicated from a pet image of an ancestral virtual pet.

The mutation rule includes that all or part of image materials of the third pet image of the filial virtual pet are obtained through mutation of the pet images of the paternal virtual pet and the maternal virtual pet, and image materials obtained through mutation are image materials that neither the first pet image nor the second pet image has.

The loss rule includes that if the first pet image and/or the second pet image has an image material of a global feature, there is a probability that the third pet image of the filial virtual pet does not have the global feature.

To sum up, in the method provided in this embodiment, the paternal virtual pet provided by the first user account is selected from the mating market, the maternal virtual pet is selected from the virtual pets owned by the current user, and the third pet image of the filial virtual pet is generated based on the genetic inheritance rule according to the first pet image of the paternal virtual pet and the second pet image of the maternal virtual pet, thereby resolving the problem that the manner of breeding by adjusting value attribute parameters may be applicable only to a client having a fighting system and consequently has a limited application range. The method according to this embodiment allows for transferring extrinsic features of the parental virtual pets belonging to different user accounts to a filial virtual pet, which is applicable to and compatible with various types of virtual pet breeding scenarios and further enriches social networking interactions between the different user accounts.

Figure 8:
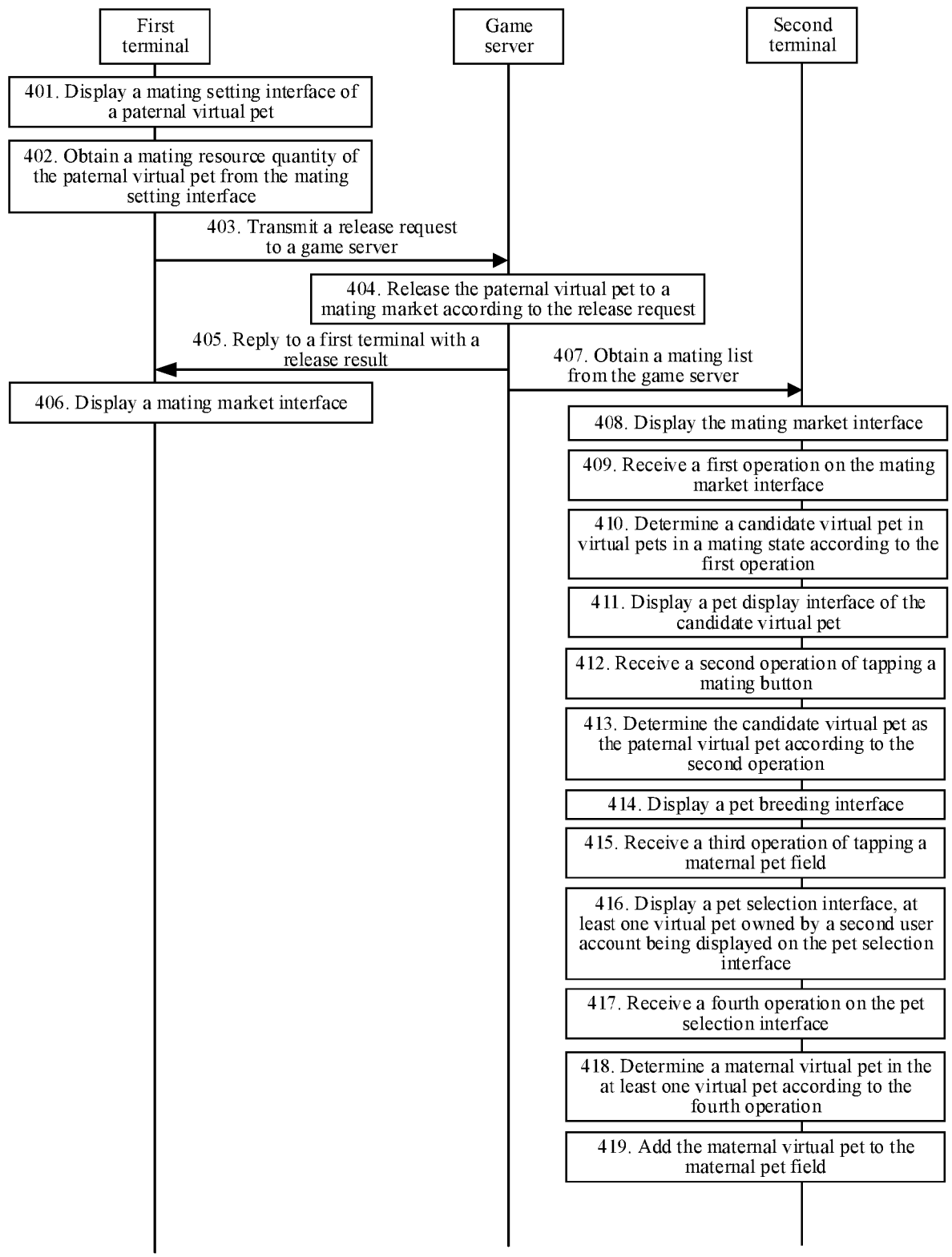
FIG. 8 is a schematic diagram of a method for breeding a virtual pet according to an exemplary embodiment of this disclosure.
Figure 9:
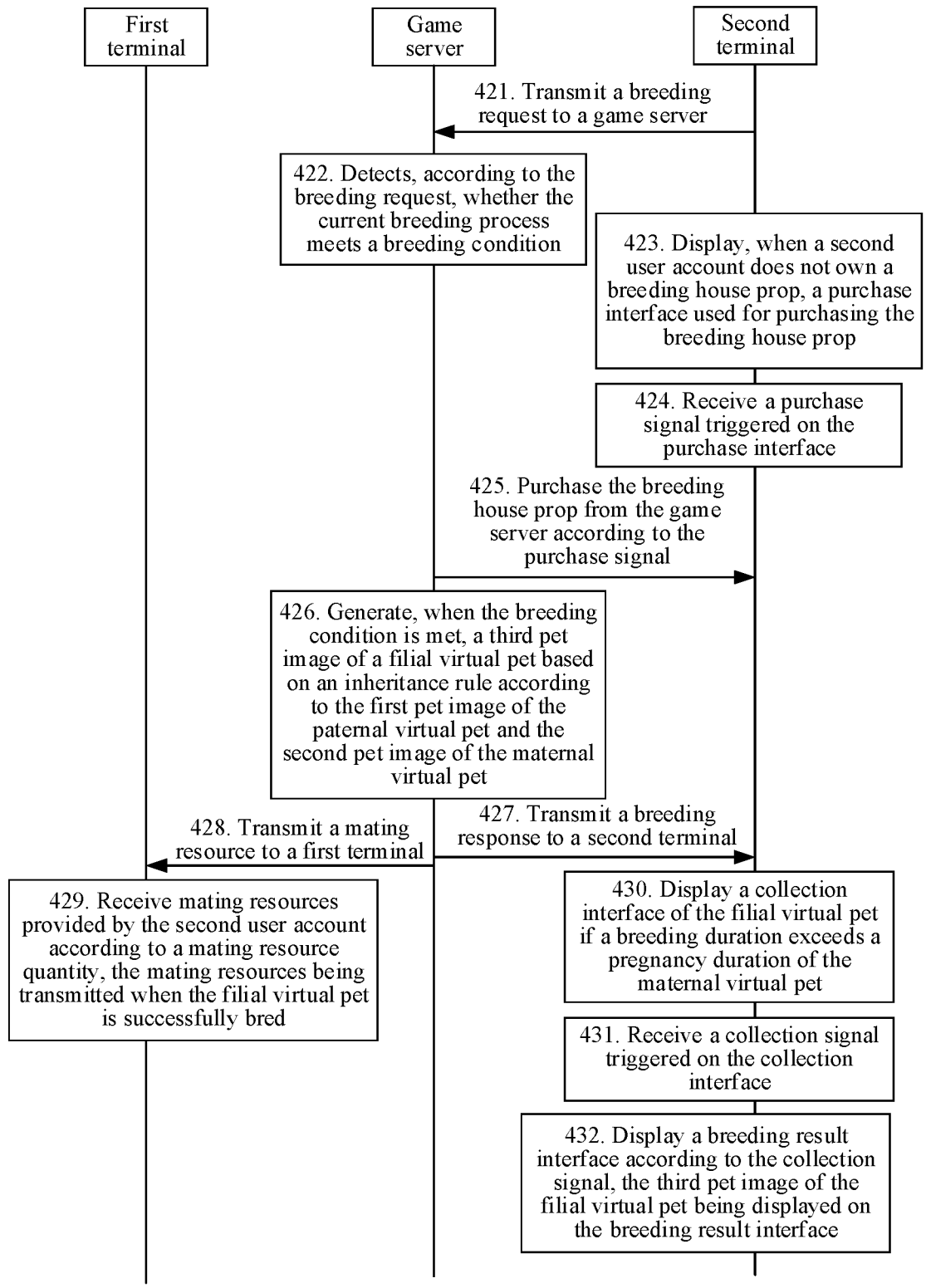
FIG. 9 is a flowchart of a method for breeding a virtual pet according to another exemplary embodiment of this disclosure.

FIG. 8 and FIG. 9 are flowcharts of a method for breeding a virtual pet according to another embodiment of this disclosure. This embodiment is described by using an example in which the method is applied to the computer system 100 shown in FIG. 1. A client is run on the first terminal 120 and the second terminal 160, the client is provided with virtual pets, and at least one pet image of each of the virtual pets is generated based on a genetic inheritance rule. The method includes the following steps:

Step 401. The first terminal displays a mating setting interface of a paternal virtual pet.

The mating setting interface is used for releasing (listing) the paternal virtual pet to a setting interface of a mating market. Optionally, the mating setting interface may be used for setting a mating resource quantity of the paternal virtual pet when the paternal virtual pet is released. The mating resource quantity is also referred to as a mating price, which is the price a user needs to pay if the user selects the released paternal virtual pet for mating and breeding.

Figure 10:
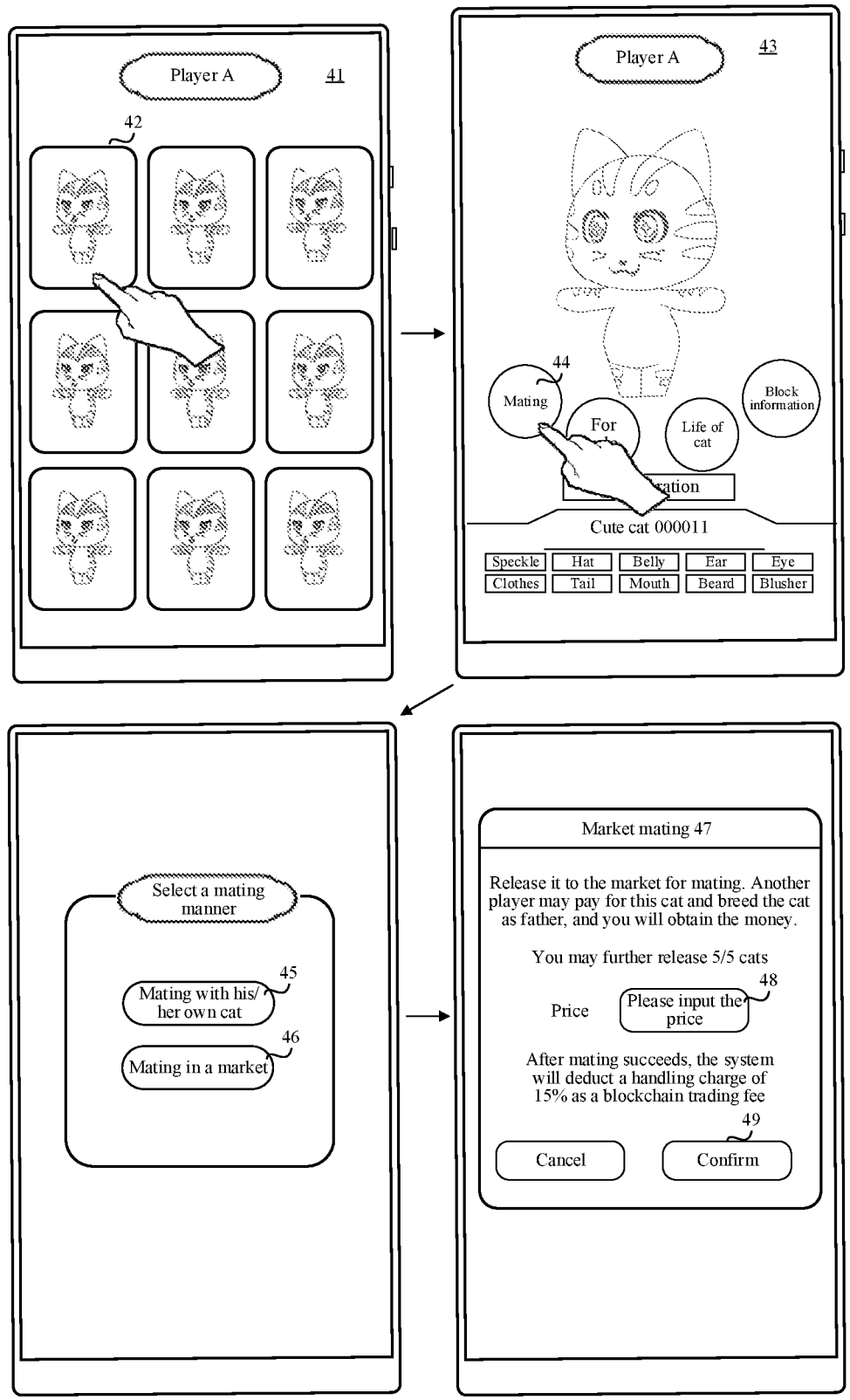
FIG. 10 is a schematic flowchart of displaying a market mating interface according to another exemplary embodiment of this disclosure.

Schematically, as shown in FIG. 10, a first terminal first displays a pet selection interface 41, and virtual pets that a first user account "player A" has owned are displayed on the pet selection interface 41. For example, the first user account owns nine virtual pets. Nine card areas are used on the pet selection interface 41 to display the virtual pets, and each card area may be used for displaying a summary of pet information of one virtual pet. The summary includes at least one of: a two-dimensional preview of the virtual pet, a name of the virtual pet, an identifier of the virtual pet, generation information of the virtual pet, or a breeding recovery time of the virtual pet.

To release one virtual pet, a first user taps a virtual pet 42. The first terminal displays a pet display interface 43 of the virtual pet 42, and the pet display interface 43 is an interface used for pet information of the virtual pet. The pet information includes at least one of: an virtual pet owner nickname, such as "player A", a 3D pet image of the virtual pet, a mating button 44, a selling button, a life of cat button, a block information button, generation information, nickname information, identification information, genetic feature information, parental information, filial information, or genealogy information.

The first user taps the mating button 44 on the pet display interface of the virtual pet 42. The first terminal receives a second operation triggered on the mating button 44, and the second operation may be a tap operation. The first terminal displays a breeding manner display interface according to the second operation, and the breeding manner display interface includes: a local breeding selection control 45 and a market breeding selection control 46. The local breeding selection control 45 may be a "mating with his/her own cat" button, and the market breeding selection control 46 may be a "mating on a market" button. The local breeding selection control 45 is used for triggering the first user account to mate two virtual pets owned by the first user account, and the market breeding selection control 46 is used for releasing a virtual pet owned by the first user account to the mating market, to mate with a virtual pet of another player as parental virtual pets. For the local breeding manner, no discussion is made in this embodiment for the moment.

The first user taps the market breeding selection control 46, the first terminal receives a selection operation triggered on the market breeding selection control 46, and the selection operation may be a tap operation. The first terminal displays a mating setting interface 47 according to the selection operation. The mating setting interface 47 is used for setting a mating price when a virtual pet is used as a paternal virtual pet for mating.

Step 402. The first terminal obtains a mating resource quantity of the paternal virtual pet from the mating setting interface.

Optionally, a price input control 48 and a confirming button 49 are displayed on the mating setting interface 47, and the first user enters, on the price input control 48, a mating price in a case of mating of the paternal virtual pet, and then taps the confirming button 49.

Step 403. The first terminal transmits a release request to a game server.

The first terminal transmits the release request to the game server, the release request carrying the first user account and an identifier of the paternal virtual pet.

The game server detects, according to the release request, whether a release parameter of the current release is valid. For the purpose of description only, this embodiment may use a male cat as an example of a paternal virtual pet. However, it is to be understood that the paternal virtual pet may be any types of virtual pets. Optionally, the release parameter includes at least one of: an owner account of a male cat, a mating price of the male cat, a current state of the male cat, or a mailbox state of the first user account.

If the release parameter includes the owner account of the male cat, the game server extracts a cat identifier of the male cat from the release request, searches for the owner account of the male cat in a database according to the cat identifier of the male cat, and detects whether the first user account is the same as the owner account; and determines that the release parameter is valid if the first user account is the owner account of the male cat; otherwise, determines that the release parameter is invalid.

If the release parameter includes the mating price of the male cat, the game server extracts the mating price of the male cat from the release request, and detects whether the mating price belongs to a preset price range; and determines that the release parameter is valid if the mating price belongs to the preset price range; otherwise, determines that the release parameter is invalid.

If the release parameter includes the current state of the male cat, the game server extracts the cat identifier of the male cat from the release request, and searches for the current state of the male cat in a database according to the cat identifier of the male cat, the current state including at least one of being on offer, being in recovery, being in mating, being in breeding, being in morphing, and being in idleness; and determines that the release parameter is valid if the current state is being in idleness or being in morphing; otherwise, determines that the release parameter is invalid.

If the release parameter includes the mailbox state of the first user account, the game server extracts the first user account from the release request, and then searches for the mailbox state of the first user account in a database; and determines that the release parameter is valid if the mailbox state of the first user account is an available state; or determines that the release parameter is invalid if the mailbox state of the first user account is an unavailable state (for example, the mailbox capacity is full).

If every release parameter of the current release is valid, step 404 is performed; and if at least one of the release parameters of the current release is invalid, the current release process is ended.

Step 404. The game server releases the paternal virtual pet to the mating market according to the release request.

Optionally, the game server stores the paternal virtual pet into a mating list, where the mating list is a list used for storing information about virtual pets in a mating state in the mating market.

The game server updates a state of the paternal virtual pet in a database of the game server to mating state.

Optionally, if the mating market is constructed on a blockchain system, the game server and the blockchain system perform information exchange, to release the paternal virtual pet to the mating market.

Step 405. The game server transmits a release request reply to the first terminal.

After successfully releasing the paternal virtual pet to the mating market, the game server transmits the release request reply to the first terminal. The release request reply is used for indicating a release result of the paternal virtual pet.

Step 406. The first terminal displays a mating market interface, the mating market interface including paternal virtual pets in the mating state.

Optionally, the first user opens the mating market interface in the first terminal, the mating market interface including paternal virtual pets in the mating state.

The mating market interface is used for displaying paternal virtual pets in the mating state on the entire mating market at the current time. The paternal virtual pets may be provided by different user accounts respectively.

Optionally, the mating market interface includes a plurality of card areas, and each card area is used for displaying a summary of pet information of one virtual pet. The summary includes at least one of: a two-dimensional preview of the virtual pet, a name of the virtual pet, an identifier of the virtual pet, generation information of the virtual pet, a current state (being in mating) of the virtual pet, or a breeding recovery time of the virtual pet.

Many paternal virtual pets need to be displayed. Therefore, the mating market interface is further provided with a screening control, and the screening control may filter or sort and display to-be-displayed paternal virtual pets according to at least one filtering condition such as a release time, a genetic feature, a generation, or a price.

The mating market interface may display only a limited quantity of virtual pets on a single page, such as nine virtual pets. Therefore, optionally, the mating market interface may be further provided with a page turning button such as "previous page" and/or "next page". If the first user taps the "previous page" button or the "next page" button, different virtual pets may be displayed in the mating market.

Evidently, the first user may view, on the mating market interface, a virtual pet released by the first user.

The foregoing process is a process of releasing a paternal virtual pet. After being released, the paternal virtual pet may be viewed by each terminal supporting the application.

Step 407. A second terminal obtains the mating list from the game server.

The second terminal is a terminal used by a second user, and the second user account logs in to the second terminal.

Optionally, the second terminal obtains the mating list from the game server, where the mating list is a list used for storing information about virtual pets in a mating state in the mating market.

Because there may be a lot of information in the mating list, the second terminal may obtain the mating list from the game server in batches according to a display progress. For example, nine virtual pets in the mating state in the mating list are currently displayed, and then when receiving a page turning operation of a user, another nine virtual pets in the mating state in the mating list are further obtained from the game server and displayed.

Step 408. The second terminal displays the mating market interface.

The mating market is a market platform opened to each terminal in an entire platform. The second terminal displays the mating market interface according to the obtained mating list.

Figure 11:
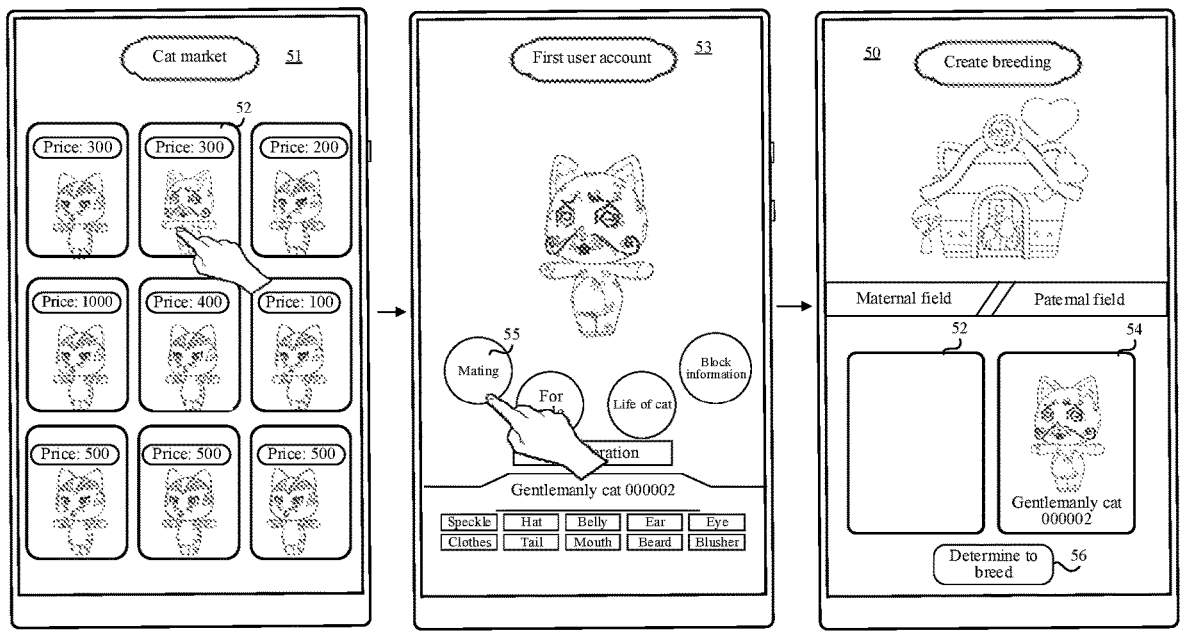
FIG. 11 is a schematic interface diagram of adding a paternal virtual pet according to another exemplary embodiment of this disclosure.

Schematically, referring to FIG. 11, the second terminal displays a mating market interface 51, and a plurality of virtual pets that may be used as paternal virtual pets are displayed on the mating market interface 51. The second user selects a favorite paternal virtual pet 52 from the mating market interface 51.

Step 409. The second terminal receives the first operation on the mating market interface.

The first operation may be a triggering operation of activating the paternal virtual pet 52 on the mating market interface 51.

Step 410. The second terminal determines a candidate virtual pet in the virtual pets in the mating state according to the first operation.

A plurality of virtual pets in the mating state are displayed on the mating market interface 51, and the second terminal determines a virtual pet tapped by the first operation as a candidate virtual pet.

For example, the second terminal determines a virtual pet "gentlemanly cat 000002" tapped by the second user as a candidate virtual pet.

Step 411. The second terminal displays a pet display interface of the candidate virtual pet.

Schematically, referring to FIG. 11, a pet display interface 53 of a candidate virtual pet is an interface used for displaying pet information of a virtual pet. The pet information includes at least one of: an owner nickname "player A" of the virtual pet, a 3D pet image of the virtual pet, a mating button 55, a selling button, a life of cat button, a block information button, generation information, nickname information, identification information, genetic feature information, parental information, filial information, and genealogy information.

Optionally, the 3D pet image may be a pet image that can actively display a 3D action and be rotated left or right and displayed. The second user may view each piece of pet information of the virtual pet on the pet display interface 53 of the candidate virtual pet, to determine whether the virtual pet may be used as a paternal virtual pet of the current breeding.

Step 412. The second terminal receives a triggering operation of activating a mating button.

After determining to use the candidate virtual pet as the paternal virtual pet of the current breeding, the second user taps the mating button on the pet display interface of the candidate virtual pet. The triggering operation is used for selecting the candidate virtual pet as the paternal virtual pet of the current breeding.

Schematically, referring to FIG. 11, the second user taps the mating button 55 on a pet display interface of a candidate virtual pet "gentlemanly cat 000002".

Step 413. The second terminal selects the candidate virtual pet as a paternal virtual pet according to the triggering operation.

After the second user taps the mating button 55 of the candidate virtual pet "gentlemanly cat 000002", the second terminal selects the candidate virtual pet "gentlemanly cat 000002" as the paternal virtual pet according to the triggering operation.

Step 414. The second terminal displays a pet breeding interface.

After selecting the candidate virtual pet "gentlemanly cat 000002" as the paternal virtual pet, the second terminal displays the pet breeding interface 50, where the pet breeding interface 50 is an interface used for selecting a paternal virtual pet and a maternal virtual pet to breed based on a genetic inheritance law to obtain a filial virtual pet.

Optionally, the pet breeding interface includes a paternal pet field 54 and a maternal pet field 52. The second user account has selected the paternal virtual pet displayed on the paternal pet field 54, and the paternal virtual pet is a virtual pet provided by the first user account on the mating market, the paternal virtual pet has a first pet image. The first pet image is an external image of the paternal virtual pet displayed to the user in the application program. The image material of the first pet image includes at least one of: a body model, skin, speckles, patterns, ears, a nose, eyes, beards, a tail, clothes, or an external pendant. The external pendant includes at least one of: a backpack, glasses, jewelry, a handheld prop, or a halo. Optionally, the first pet image is represented by using a first image parameter (or gene sequence), and the first image parameter includes an identifier corresponding to each image material of the paternal virtual pet.

Step 415. The second terminal receives a second operation of activating the maternal pet field.

Schematically, the second terminal receives the second operation, and determines, according to the second operation, the maternal virtual pet in the current breeding process from a plurality of virtual pets owned by the second user account. Optionally, the second operation is an operation of activating the maternal pet field.

Step 416. The second terminal displays a pet selection interface.

The second terminal displays the pet selection interface according to the second operation, at least one virtual pet owned by the second user account being displayed on the pet selection interface.

A virtual pet owned by the second user account is displayed on the pet selection interface. Optionally, a plurality of virtual pets owned by the second user account and meet a condition of serving as maternal virtual pets are displayed on the pet selection interface.

Schematically, referring to FIG. 6, the pet breeding interface 50 is displayed on the terminal, the second user may tap the maternal pet field 52 by using a selection operation, and then the terminal switches according to the selection operation to display the pet selection interface 51.

Step 418. The second terminal receives a selection operation on the pet selection interface.

The selection operation is a activating signal of selecting a virtual pet as a maternal virtual pet in the pet selection interface.

Step 419. The second terminal determines a maternal virtual pet from at least one virtual pet according to the selection operation.

Schematically, referring to FIG. 6, each virtual pet owned by the second user account is displayed on the pet selection interface 51. The second user may tap to select a maternal virtual pet 53, and the second terminal adds the maternal virtual pet "cute cat 000001" 53 to the maternal pet field 52 in the pet breeding interface 50 according to the selection operation.

The maternal virtual pet has a second role image. The second role image is an external image of the maternal virtual pet displayed to the user in the application program. The image material of the second role image includes at least one of: a body model, skin, speckles, patterns, ears, a nose, eyes, beards, a tail, clothes, or an external pendant. The external pendant includes at least one of: a backpack, glasses, jewelry, a handheld prop, and a halo. Optionally, the second role image is represented by using a second image parameter, and the second image parameter includes an identifier corresponding to each image material of the maternal virtual pet.

Step 420. The second terminal adds the maternal virtual pet to the maternal pet field.

The second terminal adds the maternal virtual pet 53 to the maternal pet field 52 according to the selection operation.

Step 421. The second terminal transmits a breeding request to the game server.

Schematically, a "determining to breed" button 56 is further displayed on the pet breeding interface 50. After a paternal virtual pet and the maternal virtual pet are selected, the user may tap the "determining to breed" button 56 to trigger a breeding signal. After receiving the breeding signal, the terminal transmits a breeding request to a server, where the breeding request includes information about a paternal virtual pet and information about a maternal virtual pet.

Optionally, information about parental (paternal and maternal) virtual pets includes: identifiers of the parental virtual pets; or identifiers of the parental virtual pets, the first image parameter (gene sequence) and the second image parameter (gene sequence). Optionally, the breeding request further carries the second user account in the second terminal.

Step 422. The game server detects, according to the breeding request, whether the current breeding process meets a breeding condition.

The game server extracts information about the current breeding process from the breeding request, and detects, according to the information in the breeding request, whether the current breeding process meets the breeding condition.

Optionally, the breeding condition includes but is not limited to at least one of the following three conditions:

1. The second user account owns a breeding house prop in an available state.

The breeding house prop is a prop used for providing a breeding place to the paternal virtual pet and the maternal virtual pet. A state of the breeding house prop includes: at least one of an available state, being in breeding, and breeding completed.

2. The paternal virtual pet and the maternal virtual pet do not have a close relative relationship.

Optionally, the close relative relationship means that the paternal virtual pet and the maternal virtual pet do not have a lineal blood relative relationship within three generations. For example, a parental virtual pet and a child virtual pet cannot breed with each other, and a son virtual pet and a daughter virtual pet of the same father or the same mother cannot breed with each other.

3. A breeding duration reaches a pregnancy duration corresponding to the maternal virtual pet.

The breeding duration is a breeding time staring from the beginning of the breeding process, and may be recorded according to a moment of beginning to use the breeding house prop.

Maternal virtual pets have corresponding pregnancy durations, and the pregnancy durations of different maternal virtual pets may be the same or different. A pregnancy duration of a maternal virtual pet may be set by the server. In some embodiments, a pregnancy duration of the same maternal virtual pet is adjustable. For example, a pregnancy duration of the same maternal virtual pet progressively increases after each time of breeding. The progressively increased pregnancy durations can reduce (or control) a total quantity of filial virtual pets bred by the same maternal virtual pet.

This embodiment is described by using an example in which the foregoing three breeding conditions are included at the same time. In this embodiment, detection is performed in order of the condition 1, the condition 2 and the condition 3. In other embodiments, detection may alternatively be performed according to any combination of the three conditions in any order.

Optionally, if the second user account does not own the breeding house prop in the available state, the game server transmits purchase prompt information to the terminal, to enter step 423, and the second terminal displays, according to the purchase prompt information, a user interface used for purchasing the breeding house prop, to guide the second user to purchase the breeding house prop.

Optionally, if the current breeding process simultaneously meets the foregoing three breeding conditions, step 426 is performed.

Step 423. The second terminal displays, if the second user account does not own a breeding house prop, a purchase interface used for purchasing the breeding house prop.

The purchase interface includes introduction information, a price and a purchase entrance of the breeding house prop. The purchase entrance may be a purchase button or a purchase link.

Step 424. The second terminal receives a purchase signal triggered on the purchase interface.

Optionally, the second user may tap and purchase the breeding house prop on the purchase interface. That is, the second terminal receives the purchase signal triggered by the second user on the purchase interface.

Step 425. The second terminal purchases the breeding house prop from the game server according to the purchase signal.

The game server transfers, according to the operation of the second user, a virtual resource corresponding to the breeding house prop from the second user account to an intermediate account of the game server. Then, ownership of the breeding house prop is transferred from the intermediate account of the game server to the second user account.

Step 426. The game server generates a third pet image of a filial virtual pet based on an inheritance rule according to the first pet image of the paternal virtual pet and the second pet image of the maternal virtual pet.

The genetic inheritance rule includes at least one of: a heredity rule, a mutation rule, or a loss rule.

The heredity rule includes that all or part of image materials of the third pet image of the filial virtual pet are replicated from the first pet image and/or the second pet image. Optionally, the heredity rule further means that all or part of image materials of the third pet image of the filial virtual pet are replicated from a pet image of an ancestral virtual pet.

The mutation rule includes that the third pet image of the filial virtual pet includes image materials obtained through mutation, and the image materials obtained through mutation are image materials that neither the first pet image nor the second pet image has.

The loss rule includes that if the first pet image and/or the second pet image has an image material of a global feature, the third pet image does not have the image material of the global feature, and the image material of the global feature is an entire image material covering a body model of a virtual pet representing the virtual pet as a whole and has a highest display priority.

The specific form of the genetic inheritance rule is not limited in this embodiment of this disclosure.

If the breeding request carries the identifiers of the parental virtual pets, the game server obtains the first pet image of the paternal virtual pet and the second pet image of the maternal virtual pet according to the identifiers of the parental virtual pets. The first pet image may be represented by using the first image parameter, and the second pet image may be identified by using the second image parameter. Then, the game server generates the third pet image of the filial virtual pet based on the inheritance rule according to the first pet image and the second pet image. In some optional embodiments, the game server further obtains other ancestral virtual pets according to the identifiers of the parental virtual pets, and determines all or part of image materials of the filial virtual pet according to pet images of the other ancestral virtual pets.

If the breeding request carries image parameters of the parental virtual pet, the game server obtains the first pet image and the second pet image from the breeding request. The first pet image may be represented by using the first image parameter, and the second pet image may be identified by using the second image parameter. Then, the game server generates the third pet image of the filial virtual pet based on the inheritance rule according to the first pet image and the second pet image. In some optional embodiments, the game server further obtains other ancestral virtual pets according to the identifiers of the parental virtual pets, and determines all or part of image materials of the filial virtual pet according to pet images of the other ancestral virtual pets.

Optionally, the third pet image of the filial virtual pet may be represented by using the third image parameter. The third pet image includes at least one image material from: a body model, skin, speckles, patterns, ears, a nose, eyes, beards, a tail, clothes, a global feature, or an external pendant. The external pendant includes at least one of: a backpack, glasses, jewelry, a handheld prop, or a headwear prop. Optionally, the third image parameter includes an identifier corresponding to each image material of the filial virtual pet.

After generating the third image parameter (or referred to as third gene sequence) of the filial virtual pet, the game server stores the third image parameter of the filial virtual pet. Optionally, the game server may further submit information about the filial virtual pet to the blockchain system.

Optionally, the game server further stores the information about the filial virtual pet in a database. The information about the filial virtual pet includes but is not limited to at least one of: an identifier of the filial virtual pet, an image parameter of the filial virtual pet, a birthday (generating time) of the filial virtual pet, parental information of the filial virtual pet, and a user account of a first owner of the filial virtual pet. Optionally, a default owner account of the filial virtual pet is the second user account, that is, the user account corresponding to the maternal virtual pet.

Optionally, the game server further submits the information about the filial virtual pet to the blockchain system, and stores, if a plurality of nodes on the blockchain system reach a consensus that the information about the filial virtual pet is passed, the information about the filial virtual pet to a blockchain corresponding to the virtual pet.

Optionally, after generating the third role image, the game server deducts the breeding house prop from the second user account. For example, the game server subtracts the quantity of breeding house props currently used by the second user account by one.

Optionally, the game server pays a trading fee to the blockchain system by using a resource obtained by deducting the breeding house prop. Each time information is stored on the blockchain system, some resources need to be paid to the blockchain system. Therefore, the game server further pays, to the blockchain system by using the resource obtained by deducting the breeding house prop, the trading fee for storing the information about the filial virtual pet.

Step 427. The game server transmits a breeding response to the second terminal.

Optionally, the breeding response carries the identifier of the filial virtual pet and the third image parameter of the filial virtual pet.

In different embodiments, the identifier of the filial virtual pet and the third image of the filial virtual pet may be transmitted by the game server to the second terminal after the terminal transmits a collection request to the game server according to a collection signal. The collection request is used by a user to collect the bred filial virtual pet.

Step 428. The game server transmits a bonus mating resource to the first terminal.

Because the successfully bred filial virtual pet is owned by the maternal party, the game server sends the bonus mating resource to the first terminal of the paternal party. The mating resource is a reward or a bonus for the paternal virtual pet in the current breeding process.

Optionally, the game server sends the mating resource to an email address of the first user account in an email form.

Step 429. The first terminal receives mating resources provided by the second user account according to the mating resource quantity, the mating resources being transferred if the filial virtual pet is successfully bred.

Optionally, the first terminal receives the mating resource in an email form.

Step 430. The second terminal displays a collection interface of the filial virtual pet if a breeding duration exceeds a pregnancy duration of the maternal virtual pet.

Optionally, the second terminal displays the collection interface of the filial virtual pet if breeding succeeds.

With reference to FIG. 7, the user may tap the breeding house prop 57, to enter the breeding house interface. If there are a plurality of breeding house props 57, the terminal determines, according to the activating signal of the user, information about a maternal pet cat corresponding to a selected breeding house prop 57. Moreover, the second terminal switches to the collection interface of the filial virtual pet, where the collection interface includes a "baby collection" button.

Step 431. The second terminal receives a collection signal triggered on the collection interface.

Optionally, the collection signal is the activating signal corresponding to the collection button on the collection interface. The collection button may be further named as a baby collection button, a child collection button, a pet collection button or the like.

Step 432. The second terminal displays the breeding result interface according to the collection signal, the third pet image of the filial virtual pet being displayed on the breeding result interface.

The breeding result interface is an interface used for displaying the filial virtual pet. The third role image of the filial virtual pet is displayed on the breeding result interface.

Optionally, at least one of an identifier of the filial virtual pet, a name of the filial virtual pet, mating information of the filial virtual pet, selling information of the filial virtual pet, career information of the filial virtual pet, block information of the filial virtual pet in a blockchain, an icon or an identifier or a name of each image material of the filial virtual pet, or parental information of the filial virtual pet is further displayed on the breeding result interface.

In other embodiments, after the first terminal releases the paternal virtual pet to the mating market, the paternal virtual pet may be manually suspended (unlisted or deleted) from the mating market. Optionally, the first terminal displays a pet display interface of the paternal virtual pet, a suspension button being displayed on the pet display interface; receives a suspension operation triggered on the suspension button; and transmits a suspension request to the game server, the suspension request being used for requesting to delete the paternal virtual pet from the mating market. The game server detects, according to the suspension request, whether the current suspension is valid, where a detection method is similar to that in the release process; and if the current suspension process is valid, the game server suspends the paternal virtual pet from the mating market.

To sum up, in the method provided in this embodiment, the paternal virtual pet provided by the first user account is selected from the mating market, the maternal virtual pet is selected from the virtual pets owned by the second user account of the current user, and the third pet image of the filial virtual pet is generated based on the genetic inheritance rule according to the first pet image of the paternal virtual pet and the second pet image of the maternal virtual pet, thereby resolving the problem in the related art that the manner of breeding by adjusting value attribute parameters may be applicable to only a client having a fighting system and consequently has a limited application range. The method according to this embodiment allows for transferring extrinsic features of the parental virtual pets belonging to different user accounts to a filial virtual pet, which is applicable to and compatible with various types of virtual pet breeding scenarios and further enriches social networking interactions between the different user accounts.

In the method provided in this embodiment, by selecting two virtual pets of different user accounts as parental virtual pets, a user account may use a virtual pet having a scarce genetic feature that the user account does not own but another account owns as a paternal virtual pet, and then obtain a filial virtual pet having the scarce genetic feature in a breeding manner, so that another manner is added to obtain the virtual pet with the scarce genetic feature in addition to a purchase manner, and sociability between the different user accounts is improved.

In the method provided in this embodiment, a breeding house prop is deducted in a breeding process, and if pet information of the virtual pet is stored on the blockchain system, a resource corresponding to the breeding house prop is used for paying a trading fee to the blockchain system, so that information about the filial virtual pet in this embodiment may be stored on the blockchain system, to be compatible with a logic process of the blockchain system.

Figure 12:
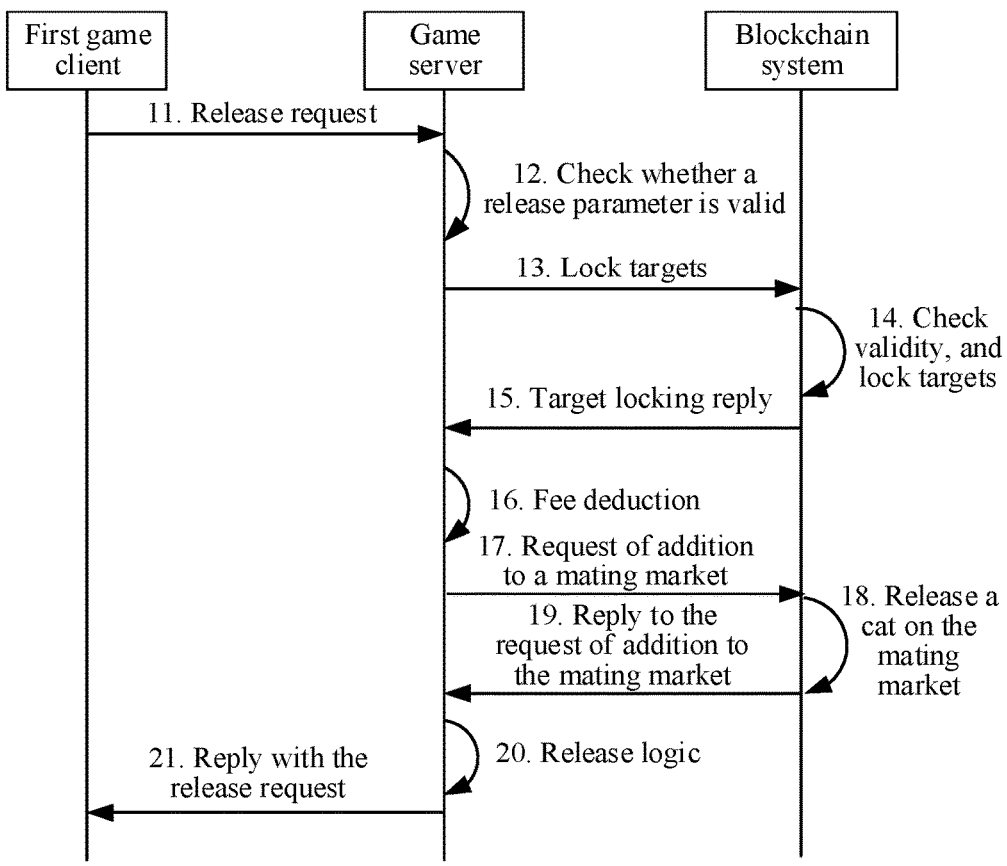
FIG. 12 is a release flowchart of a method for breeding a virtual pet according to another exemplary embodiment of this disclosure.
Figure 13:
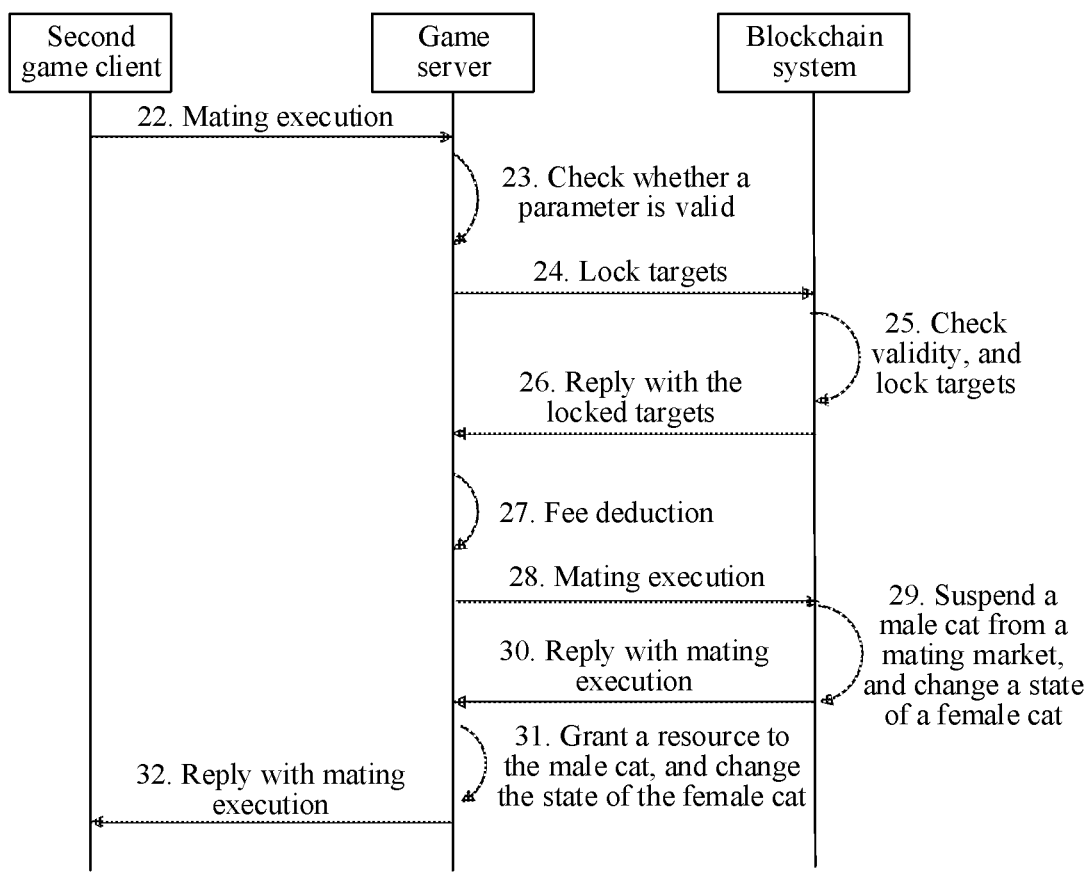
FIG. 13 is a mating flowchart of a method for breeding a virtual pet according to another exemplary embodiment of this disclosure.
Figure 14:
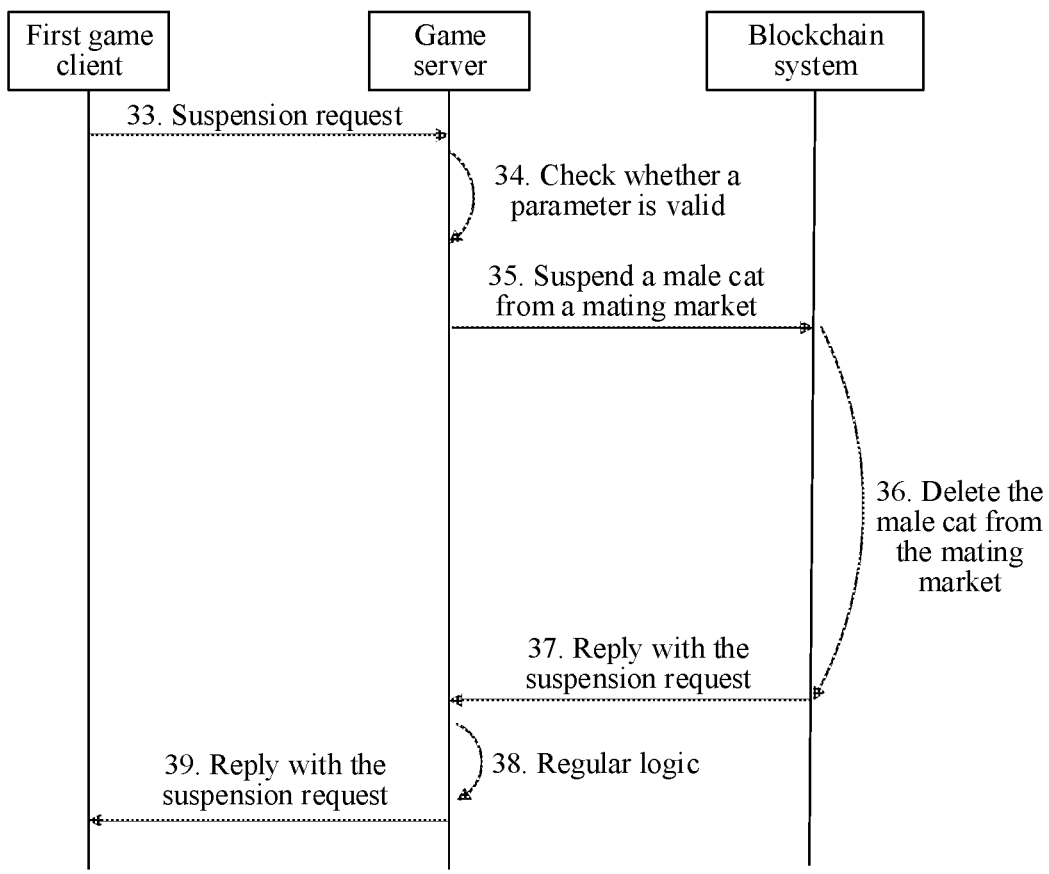
FIG. 14 is a suspension flowchart of a method for breeding a virtual pet according to another exemplary embodiment of this disclosure.

In a schematic example in which a virtual pet is a pet cat, a paternal virtual pet is briefly referred to as a male cat, and a maternal virtual pet is briefly referred to as a female cat. A process in which pet cats in different user accounts mate and breed, typically includes:

1. A process of releasing a male cat, as shown in FIG. 12;
2. A process of mating between the male cat and a female cat, as shown in FIG. 13; and
3. A process of suspending the male cat, as shown in FIG. 14.

Referring to FIG. 12, a process in which a first user releases a male cat may include the following steps:

Step 11. A first game client transmits a release request to a game server.

A first user account logs in to the first game client, and the first user account owns at least one pet cat. All or part of pet cats owned by the first user account meet a condition of serving as a male cat. For example, gender of the pet cats is male; and in another example, the pet cats do not have default gender, and gender may be designated arbitrarily in a breeding process.

If the first user selects a pet cat as a male cat from the first game client, the first game client transmits the release request to the server, the release request carrying a cat identifier of the male cat. Optionally, the release request further carries the first user account and a mating price. The mating price is a quantity of resources that need to be paid when another user account requests the male cat to perform mating. The mating price may be designated arbitrarily by the user.

In some possible embodiments, the mating price may naturally decrease as time goes by.

Correspondingly, the game server receives the release request of the first game client.

Step 12. The game server detects whether a parameter is valid.

The game server obtains a release parameter of the current release according to the release request, and detects whether the release parameter is valid. Optionally, the release parameter includes at least one of: an owner account of a male cat, a mating price of the male cat, a current state of the male cat, and a mailbox state of the first user account.

If the release parameter includes the owner account of the male cat, the game server extracts a cat identifier of the male cat from the release request, searches for the owner account of the male cat in a database according to the cat identifier of the male cat, and detects whether the first user account is the same as the owner account; and determines that the release parameter is valid if the first user account is the owner account of the male cat; otherwise, determines that the release parameter is invalid.

If the release parameter includes the mating price of the male cat, the game server extracts the mating price of the male cat from the release request, and detects whether the mating price belongs to a preset price range; and determines that the release parameter is valid if the mating price belongs to the preset price range; otherwise, determines that the release parameter is invalid.

If the release parameter includes the current state of the male cat, the game server extracts the cat identifier of the male cat from the release request, and searches for the current state of the male cat in a database according to the cat identifier of the male cat, the current state including at least one of being on offer, being in recovery, being in mating, being in breeding, being in morphing, or being in idleness; and determines that the release parameter is valid if the current state is being in idleness or being in morphing; otherwise, determines that the release parameter is invalid.

If the release parameter includes the mailbox state of the first user account, the game server extracts the first user account from the release request, and then checks the mailbox state of the first user account in a database; and determines that the release parameter is valid if the mailbox state of the first user account is an available state; or determines that the release parameter is invalid if the mailbox state of the first user account is an unavailable state (for example, the mailbox capacity is full).

If each of release parameters of the current release is valid, step 13 is performed; and if at least one of the release parameters of the current release is invalid, the current release process is ended.

Step 13. The game server locks the mating cat.

In a case of determining that each release parameter of the current release is valid, the game server transmits a locking request to a blockchain system, the locking request being used for requesting the blockchain system to set the male cat about to enter a mating market to a locked state, to prevent the male cat from being sold or transferred during the release process.

Optionally, the locking request carries a cat identifier of the male cat. That is, the male cat is a locked target. Optionally, the locking request further carries the first user account and the mating price.

Correspondingly, the blockchain system receives the locking request.

Step 14. The blockchain system checks validity of the locking request, and locks targets.

The blockchain system detects, according to the locking request, whether each release parameter of the current release is valid, using the same or a subset of the steps of the detection manner described in step 12. For example, the blockchain system may not detect the mailbox state of the first user account.

Data in the game server may be different from data stored in the blockchain system due to a reason such as a hacker attack or a synchronization failure, therefore the game server and the blockchain system need to perform validity detection respectively.

If a detection result of the blockchain system is that each release parameter of the current release is valid, the state of the male cat in the blockchain is set to the locked state. Otherwise, the current release process is ended.

Step 15. The blockchain system transmits a locking reply to the game server.

After setting the male cat to the locked state, the blockchain system transmits the locking reply to the game server. The locking reply is used for indicating that the male cat has been set to a locked state.

Optionally, if at least one of the release parameters of the current release is invalid, the locking reply transmitted by the blockchain system to the game server carries a reason why the current release fails.

Step 16. The game server performs fee deduction.

A trading fee (or referred to as handling charge or transaction fee) needs to be paid for each trading in the blockchain system. Therefore, in response to receiving a correct locking reply, the game server deducts a virtual resource from the account corresponding to the first user account, where the virtual resource may be virtual currency, game currency, or the like.

Step 17. The game server requests the blockchain system to add the male cat to the mating market.

If the fee deduction succeeds, the game server transmits the release request to the blockchain system, the release request being used for requesting the blockchain system to add the male cat to the mating market. The release request carries: the first user account, and the cat identifier and the mating price of the male cat.

Correspondingly, the blockchain system receives the release request transmitted by the game server.

Step 18. The blockchain system releases the male cat on the mating market.

The blockchain system sets, according to the release request, the state of the male cat to being in mating, and adds the pet information and the mating price of the male cat to a mating list, the mating list being used for storing information about each pet cat released on the mating market.

Step 19. The blockchain system transmits a reply to the game server, the reply comprising a result of adding the male cat to the mating market.

After the blockchain system adds the male cat successfully or unsuccessfully to the mating market, the blockchain system transmits a reply message to the game server, the reply message being used for indicating a result of adding the male cat to the mating market.

Correspondingly, the game server receives the reply transmitted by the blockchain system.

Step 20. The game server performs release logic.

After receiving a result that the male cat is successfully released, the game server sets the state of the male cat in the game server to being in mating, and stores the mating price of the male cat.

Step 21. The game server sends to the first game client a reply to the release request.

After the male cat is successfully released, the game server further replies to the first game client, to help the first game client learn or display a release result.

Referring to FIG. 13, a process in which a second user mates (pairs) a male cat and a female cat may include the following steps:

Step 22. A second game client performs mating execution by interacting with a game server.

A second user account logs in to the second game client, and the second user account owns at least one pet cat. All or part of pet cats owned by the second user account meet a condition of serving as a female cat. For example, gender of the pet cats is female; and in another example, the pet cats do not have default gender, and gender may be designated arbitrarily in a breeding process.

If the second user intends to obtain an excellent gene of another male cat in a breeding manner, such as a scarce local feature gene or a global feature sold in a limited quantity, the second user looks for a male cat provided by another user account on the mating market. Moreover, the second user selects one pet cat from pet cats owned by the second user as a female cat.

In this embodiment, description is made by using an example in which the second user looks for a male cat provided by the first user account to perform breeding. In this case, the second game client transmits a mating request to the game server, the mating request carrying a cat identifier of the male cat and a cat identifier of the female cat. Optionally, the mating request further carries the second user account.

Step 23. The game server checks whether a parameter is valid

The game server checks whether each mating parameter in the mating request is valid. The game server obtains each mating parameter according to the cat identifier of the male cat, the cat identifier of the female cat and the second user account, and detects validity of each mating parameter. The mating parameters include at least one of the following parameters: an owner account of the female cat, a mating price of the male cat, current states of the male cat and the female cat, whether the male cat and the female cat have a close relative relationship, or whether the second user account owns sufficient available breeding house props.

If the mating parameter includes the owner account of the female cat, the game server extracts a cat identifier of the female cat from the mating request, searches for the owner account of the female cat in a database according to the cat identifier of the female cat, and detects whether the second user account is the same as the owner account; and determines that the mating parameter is valid if the second user account is the owner account of the female cat; otherwise, determines that the mating parameter is invalid.

If the mating parameter includes the mating price of the male cat, the game server extracts the mating price of the male cat from the mating request, and detects whether the mating price belongs to a preset price range; and determines that the mating parameter is valid if the mating price belongs to the preset price range; otherwise, determines that the mating parameter is invalid.

If the mating parameter includes the current states of the male cat and the female cat, the game server extracts the cat identifiers of the male cat and the female cat from the mating request, and searches for the current states of the two cats in a database according to the cat identifiers of the male cat and the female cat, the current state including at least one of being on offer, being in recovery, being in mating, being in breeding, being in morphing, or being in idleness; and if the current state of the male cat is being in mating and the current state of the female cat is being in idleness or being in morphing, determines that the mating parameter is valid; otherwise, determines that the mating parameter is invalid.

If the mating parameter includes whether the male cat and the female cat have a close relative relationship, the game server extracts the cat identifiers of the male cat and the female cat from the mating request, searches for genealogy information of the two cats in a database according to the cat identifiers of the male cat and the female cat, and determines, according to the genealogy information, whether the two cats are in the close relative relationship. The close relative relationship means that the paternal virtual pet and the maternal virtual pet do not have a lineal blood relative relationship within three generations. For example, a parental virtual pet and a child virtual pet cannot breed with each other, and a son virtual pet and a daughter virtual pet of the same father or the same mother cannot breed with each other. If the two cats are not in the close relative relationship, the game server determines that the mating parameter is valid; otherwise, determines that the mating parameter is invalid.

If the mating parameter includes whether the second user account owns sufficient available breeding house props, the game server extracts the second user account from the mating request, searches for information about props owned by the second user account in a database according to the second user account, and determines, according to the information about the props, whether the second user account owns breeding houses in an available state and whether a quantity of the breeding houses reaches a predetermined quantity; and if the second user account owns a sufficient quantity of breeding house props in the available state, determines that the mating parameter is valid; otherwise, determines that the mating parameter is invalid.

If each of mating parameters of the current mating is valid, step 24 is performed; and if at least one of the mating parameters of the current mating is invalid, the current mating process is ended.

Step 24. The game server locks target cats via the blockchain system.

When determining that each mating parameter of the current mating is valid, the game server transmits a locking request to a blockchain system, the locking request being used for requesting the blockchain system to set a male cat and a female cat about to mate to a locked state, to prevent the male cat and the female cat from being sold or transferred during a mating process, or prevent the male cat from being locked by another user.

Optionally, the locking request carries the cat identifier of the male cat and the cat identifier of the female cat. That is, the male cat and the female cat are locked targets. Optionally, the locking request further carries the first user account and the mating price.

Step 25. The blockchain system checks validity, and locks targets.

The blockchain system detects, according to the locking request, whether each mating parameter of the current mating is valid, using the same or a subset of the steps of the detection manner described in step 23.

Data in the game server may be different from data stored in the blockchain system due to a reason such as a hacker attack or a synchronization failure, and therefore the game server and the blockchain system need to perform validity detection respectively.

If a detection result of the blockchain system is that each mating parameter of the current mating is valid, the states of the male cat and the female cat in the blockchain are set to the locked state. Otherwise, the current mating process is ended.

Step 26. The blockchain system replies to the game server with the locked targets.

After setting the male cat and the female cat to the locked state, the blockchain system transmits the locking reply to the game server. The locking reply is used for indicating that the male cat and the female cat have been set to being successfully locked.

Optionally, if at least one of the mating parameters of the current mating is invalid, the locking reply transmitted by the blockchain system to the game server carries a reason why the current mating fails.

Step 27. The game server performs fee deduction.

A trading fee (or referred to as handling charge or transaction fee) needs to be paid for each trading in the blockchain system. Therefore, when receiving a successful locking reply, the game server deducts a virtual resource from the account corresponding to the second user account, where the virtual resource may be a resource such as virtual currency or game currency.

Schematically, the game server further deducts a breeding house prop required by the current breeding from props corresponding to the second user account. All or part of resources corresponding to the breeding house prop may be used for paying a trading fee.

Schematically, the game server deducts a resource corresponding to the mating price from the account corresponding to the second user account, the resource corresponding to the mating price being used for paying the first user account providing the male cat, if a new baby cat is bred successfully.

Step 28. The game server performs mating execution via the blockchain system.

The game server transmits a mating request to the blockchain system, the mating request carrying the cat identifiers of the male cat and the female cat. Optionally, the mating request further carries the second user account.

Step 29. The blockchain system suspends the male cat from the mating market, and changes the state of the female cat.

The blockchain system modifies the state of the male cat in the blockchain from being in mating to another state, such as being in idleness. The blockchain system further modifies the state of the female cat in the blockchain from another state to being in breeding.

Then, the blockchain system deletes the male cat from a mating list, the mating list being used for storing information about a pet cat in a mating state on the mating market.

Step 30. The blockchain system replies to the game server with status of mating execution.

The blockchain system replies to the game server with a mating execution result. Schematically, the blockchain system transmits information about successful mating execution to the game server.

Step 31. The game server grants a resource to the male cat, and changes the state of the female cat.

After the blockchain system successfully performs mating execution, the game server modifies the state of the male cat in the database from being in mating to another state, such as being in idleness. The game server further modifies the state of the female cat in the database from another state to being in breeding, and begins to count a breeding duration.

Schematically, the game server generates a third virtual image of the baby cat based on a genetic inheritance law according to a first pet image of the male cat and a second pet image of the female cat, where the pet image may be a 3D pet image including a plurality of 3D image materials.

Schematically, the game server transmits a mating resource to the first game client corresponding to the male cat, the mating resource being a virtual resource provided by the second user account, and the mating resource being used for serving as a reward or bonus provided to the first user account if the baby cat is successfully bred. Moreover, the game server further sets an owner of the new baby cat to the second user account. In one implementation, the game server transmits the mating resource to the first game client corresponding to the male cat in an email form, and the first user obtains the rewarded mating resource in the form of receiving an email.

Step 32. The game server replies to the second game client with mating execution.

Optionally, if the second game client requests to collect a baby cat, the game server transmits a cat identifier and a gene sequence of the baby cat to the second game client, and the second game client displays a third pet image of the baby cat to the second user according to the cat identifier and the gene sequence of the baby cat.

Referring to FIG. 14, a process in which a first user suspends a male cat may include the following steps:

Step 33. A first game client transmits a suspension request to a game server.

Suspension refers to an operation of removing the male cat from a mating market, to prevent the male cat from being always in a mating state on the mating market. After the first user releases the male cat to the mating market, in addition to a case that normal mating causes suspension, there are further two other suspension manners:

Automatic Suspension Manner

After the male cat is released to the mating market, the game server counts a release time of the male cat. After the counted duration reaches a preset duration (for example, two hours), the game server actively suspends the male cat from the mating market.

Manual Suspension Manner

After the first user releases the male cat to the mating market, if the first user changes mind, the first user may tap a suspension button on a pet display interface of the male cat, to trigger suspension of the male cat from the mating market.

Correspondingly, the first game client transmits the suspension request to the game server, the suspension request carrying a cat identifier of the male cat. Optionally, the suspension request further carries a first user account.

Step 34. The game server detects whether a parameter is valid.

The game server obtains a suspension parameter of the current suspension according to the suspension request, and detects whether the suspension parameter is valid. Optionally, the suspension parameter: at least one of an owner account of the male cat and a current state of the male cat.

If the suspension parameter includes the owner account of the male cat, the game server extracts a cat identifier of the male cat from the suspension request, searches for the owner account of the male cat in a database according to the cat identifier of the male cat, and detects whether the first user account is the same as the owner account; and determines that the suspension parameter is valid if the first user account is the owner account of the male cat; otherwise, determines that the suspension parameter is invalid.

If the suspension parameter includes the current state of the male cat, the game server extracts the cat identifier of the male cat from the suspension request, and searches for the current state of the male cat in a database according to the cat identifier of the male cat, the current state including at least one of being on offer, being in recovery, being in mating, being in breeding, being in morphing, and being in idleness; and determines that the suspension parameter is valid if the current state is being in idleness or being in morphing; otherwise, determines that the suspension parameter is invalid.

If each of suspension parameters of the current suspension process is valid, step 35 is performed; and if at least one of the suspension parameters of the current suspension process is invalid, the current suspension process is ended.

Step 35. The game server requests the blockchain system to remove the male cat from the mating market.

In response to determining that each suspension parameter of the current suspension is valid, the game server transmits the suspension request to the blockchain system. Optionally, the suspension request carries the cat identifier of the male cat and the first user account.

The blockchain system detects, according to the locking request, whether each suspension parameter of the current suspension is valid, using the same or a subset of the steps of the detection manner described in step 34.

Step 36. The blockchain system deletes the male cat from the mating market.

If each suspension parameter of the current suspension is valid, the blockchain system deletes the male cat from a mating list. The mating list is a list used for storing each pet cat in the mating state on the mating market.

Moreover, the blockchain system updates the state of the male cat in the blockchain from being in mating to another state, such as being in idleness.

Step 37. The blockchain system replies to the game server with suspension status.

After the blockchain system removes the male cat successfully from the mating market, the blockchain system transmits a suspension reply message to the game server, the suspension reply message being used for indicating a suspension result of suspending the male cat from the mating market.

Step 38. The game server performs update logic.

After the game server receives the suspension reply message transmitted by the blockchain system, the game server updates the state of the male cat in the database from being in mating to another state, such as being in idleness.

Step 39. The game server sends to the first game client a reply to the suspension request.

The game server further sends to the first game client a reply to the suspension request, to help the first game client learn the suspension result of the male cat, and display the suspension result of the male cat to the first user.

The following is apparatus embodiments of the embodiments of this application, and the apparatus embodiments are in a one-to-one correspondence with the foregoing method embodiments. For details that are not elaborated in the apparatus embodiments, reference is made to the foregoing corresponding method embodiments.

Figure 15:
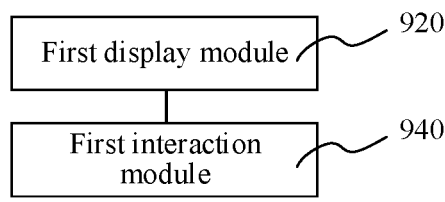
FIG. 15 is a block diagram of an apparatus for breeding a virtual pet according to an exemplary embodiment of this disclosure.

FIG. 15 is a block diagram of an apparatus for breeding a virtual pet according to an exemplary embodiment of this disclosure. The breeding apparatus may be implemented as a part of a first client (or a first terminal) through software, hardware or a combination thereof. The breeding apparatus is provided with virtual pets and at least one pet image of each of the virtual pets is generated based on a genetic inheritance rule. The apparatus includes: a first display module 920 and a first interaction module 940.

The first display module 920 is configured to display a mating market interface, the mating market interface including virtual pets in a mating state.

The first interaction module 940 is configured to select a paternal virtual pet from the mating market interface according to a first operation.

The first display module 920 is configured to display a pet breeding interface, the pet breeding interface including a paternal pet field and a maternal pet field, the paternal virtual pet being displayed in the paternal pet field, the paternal virtual pet being a virtual pet provided by a first user account on a mating market, and the paternal virtual pet having a first pet image.

The first interaction module 940 is configured to add a maternal virtual pet to the maternal pet field according to a second operation, the maternal virtual pet being a virtual pet owned by a second user account logging in to the terminal, and the maternal virtual pet having a second pet image.

The first display module 920 is configured to display a breeding result interface if breeding succeeds, a filial virtual pet being displayed on the breeding result interface, the filial virtual pet having a third pet image, and the third pet image being generated based on the genetic inheritance rule according to the first pet image and the second pet image.

In an optional embodiment, the first interaction module 940 is further configured to receive the first operation on the mating market interface; and determine a candidate virtual pet in the virtual pets in the mating state according to the first operation; the first display module 920 is further configured to display a pet display interface of the candidate virtual pet, the pet display interface including a mating button; and the first interaction module 940 is configured to receive a triggering operation of activating the mating button; and determine the candidate virtual pet as the paternal virtual pet according to the triggering operation.

In an optional embodiment, the first interaction module 940 is further configured to receive the second operation of activating the maternal pet field; the first display module 920 is further configured to display a pet selection interface, at least one virtual pet owned by the second user account being displayed on the pet selection interface; and the first interaction module 940 is further configured to receive a selection operation on the pet selection interface; determine the maternal virtual pet from the at least one virtual pet according to the selection operation; and add the maternal virtual pet to the maternal pet field.

In an optional embodiment, the first display module 920 is configured to display a collection interface of the filial virtual pet if a breeding duration exceeds a pregnancy duration of the maternal virtual pet; the first interaction module 940 is further configured to receive a collection signal triggered on the collection interface; and the first display module 920 is further configured to display the breeding result interface according to the collection signal, the third pet image of the filial virtual pet being displayed on the breeding result interface.

In an optional embodiment, the first display module 920 is configured to display, if the second user account does not own a breeding house prop, a purchase interface used for purchasing the breeding house prop, the breeding house prop being a prop used for providing a breeding place to the paternal virtual pet and the maternal virtual pet; and the first interaction module 940 is configured to receive a purchase signal triggered on the purchase interface; and purchase the breeding house prop from a server according to the purchase signal.

In an optional embodiment, the inheritance rule includes at least one of: a heredity rule, a mutation rule and a loss rule;

the heredity rule includes that all or part of image materials of the third pet image of the filial virtual pet are replicated from the first pet image and/or the second pet image;

the mutation rule includes that the third pet image of the filial virtual pet includes image materials obtained through mutation, and the image materials obtained through mutation are image materials that neither the first pet image nor the second pet image has; and the loss rule includes that if the first pet image and/or the second pet image has an image material of a global feature, the third pet image does not have the image material of the global feature, and the image material of the global feature is an entire image material covering a body model of a virtual pet and has a highest display priority.

Figure 16:
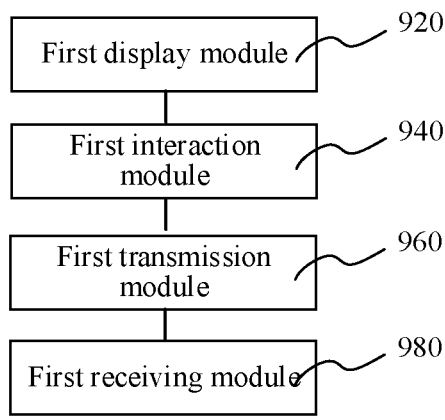
FIG. 16 is a block diagram of an apparatus for breeding a virtual pet according to another exemplary embodiment of this disclosure.

In an optional embodiment, the apparatus further includes: a first transmission module 960 and a first receiving module 980, as shown in FIG. 16.

The first transmission module 960 is configured to transmit a breeding request to the server, the breeding request including information about the paternal virtual pet and information about the maternal virtual pet; and the first receiving module 980 is configured to receive a breeding response of the server, the breeding response including information about the filial virtual pet such as an image parameter.

Figure 17:
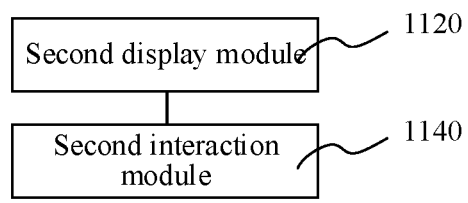
FIG. 17 is a block diagram of an apparatus for breeding a virtual pet according to another exemplary embodiment of this disclosure.

FIG. 17 is a block diagram of an apparatus for breeding a virtual pet according to an exemplary embodiment of this disclosure. The breeding apparatus may be implemented as a part of a second client (or a second terminal) through software, hardware or a combination thereof. The breeding apparatus is provided with a virtual pet and at least one pet image of the virtual pet is generated based on a genetic inheritance rule. The apparatus includes: a second display module 1120 and a second interaction module 1140.

The second display module 1120 is configured to display a mating setting interface of a paternal virtual pet, the mating setting interface being used for releasing the paternal virtual pet to a setting interface of a mating market;

the second interaction module 1140 is configured to obtain a mating resource quantity of the paternal virtual pet from the mating setting interface; and the second display module 1120 is further configured to display a mating market interface, the mating market interface including the paternal virtual pet in a mating state, and the paternal virtual pet being used for breeding with a maternal virtual pet owned by a second user account to obtain a filial virtual pet, the paternal virtual pet having a first pet image, the maternal virtual pet having a second pet image, and the filial virtual pet having a third pet image generated based on the genetic inheritance rule according to the first pet image and the second pet image.

Figure 18:
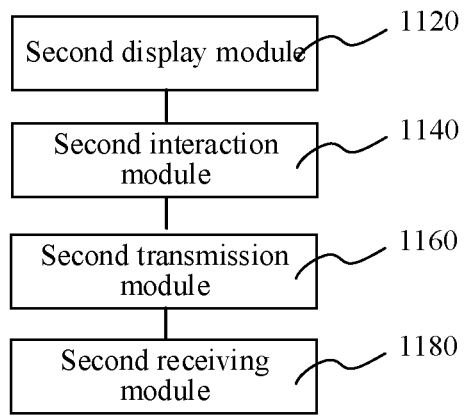
FIG. 18 is a block diagram of an apparatus for breeding a virtual pet according to an exemplary embodiment of this disclosure.

In an optional embodiment, the apparatus further includes: a second transmission module 1160 and a second receiving module 1180, as shown in FIG. 18.

The second transmission module 1160 is configured to transmit a release request to a server, the release request being used for requesting to add the paternal virtual pet to the mating market; and the second receiving module 1180 is configured to receive a release request reply transmitted by the server, the release request reply including a release result of the paternal virtual pet.

In an optional embodiment, the second receiving module 1180 is configured to receive mating resources provided by the second user account according to the mating resource quantity, the mating resources being transmitted if the filial virtual pet is successfully bred.

In an optional embodiment, the second display module 1120 is configured to display a pet display interface of the paternal virtual pet, a suspension button being displayed on the pet display interface;

the second interaction module 1140 is configured to receive a suspension operation triggered on the suspension button; and the second transmission module 1160 is configured to transmit a suspension request to the game server, the suspension request being used for requesting to delete the paternal virtual pet from the mating market.

Figure 19:
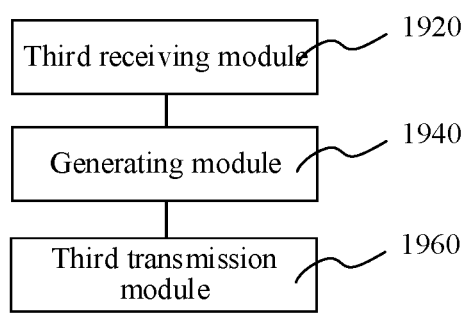
FIG. 19 is a block diagram of an apparatus for breeding a virtual pet according to an exemplary embodiment of this disclosure.

FIG. 19 is a block diagram of an apparatus for breeding a virtual pet according to an exemplary embodiment of this disclosure. The breeding apparatus may be implemented as all or a part of a game server through software, hardware or a combination thereof. The breeding apparatus is provided with virtual pets and at least one pet image of each of the virtual pets is generated based on a genetic inheritance rule. The apparatus includes: a third receiving module 1920, a generating module 1940 and a third transmission module 1960.

The third receiving module 1920 is configured to receive a breeding request transmitted by a terminal, the breeding request carrying information about a paternal virtual pet and information about a maternal virtual pet, the paternal virtual pet being a virtual pet provided by a first user account on a mating market, the maternal virtual pet being a virtual pet owned by a second user account logging in to the terminal, the paternal virtual pet having a first pet image, and the maternal virtual pet having a second pet image;

the generating module 1940 is configured to generate a third pet image of a filial virtual pet based on an inheritance rule according to the first pet image of the paternal virtual pet and the second pet image of the maternal virtual pet; and the third transmission module 1960 is configured to transmit information about the filial virtual pet to the terminal, the terminal being configured to display a breeding result interface according to the information about the filial virtual pet, and the third pet image of the filial virtual pet being displayed on the breeding result interface.

In an optional embodiment, the inheritance rule includes at least one of: a heredity rule, a mutation rule and a loss rule;

the heredity rule includes that all or part of image materials of the third pet image are from the first pet image and/or the second pet image;

the mutation rule includes that all or part of image materials of the third pet image are image materials obtained through mutation, and the image materials obtained through mutation are image materials that neither the first pet image nor the second pet image has; and the loss rule includes that if the first pet image and/or the second pet image has an image material of a global feature, the third pet image does not have the image material of the global feature, and a display priority of the image material of the global feature is higher than those of other image materials.

In an optional embodiment, the generating module 1940 is configured to generate, if the current breeding process meets a breeding condition, a third pet image of a filial virtual pet based on an inheritance rule according to the first pet image of the paternal virtual pet and the second pet image of the maternal virtual pet.

In an optional embodiment, the breeding condition includes at least one of the following conditions:

a current user account corresponding to the terminal owns a breeding house prop in an available state, the breeding house prop being a prop used for providing a breeding place to the paternal virtual pet and the maternal virtual pet;

the paternal virtual pet and the maternal virtual pet do not have a close relative relationship; or a breeding duration is greater than a pregnancy duration corresponding to the maternal virtual pet, the breeding duration being a breeding time starting from a filial virtual pet begins to be bred.

In an optional embodiment, the apparatus further includes: a deduction module 1980, as shown in FIG. 19.

The deduction module 1980 is configured to deduct the breeding house prop from the current user account after the third role image is generated.

Figure 20:
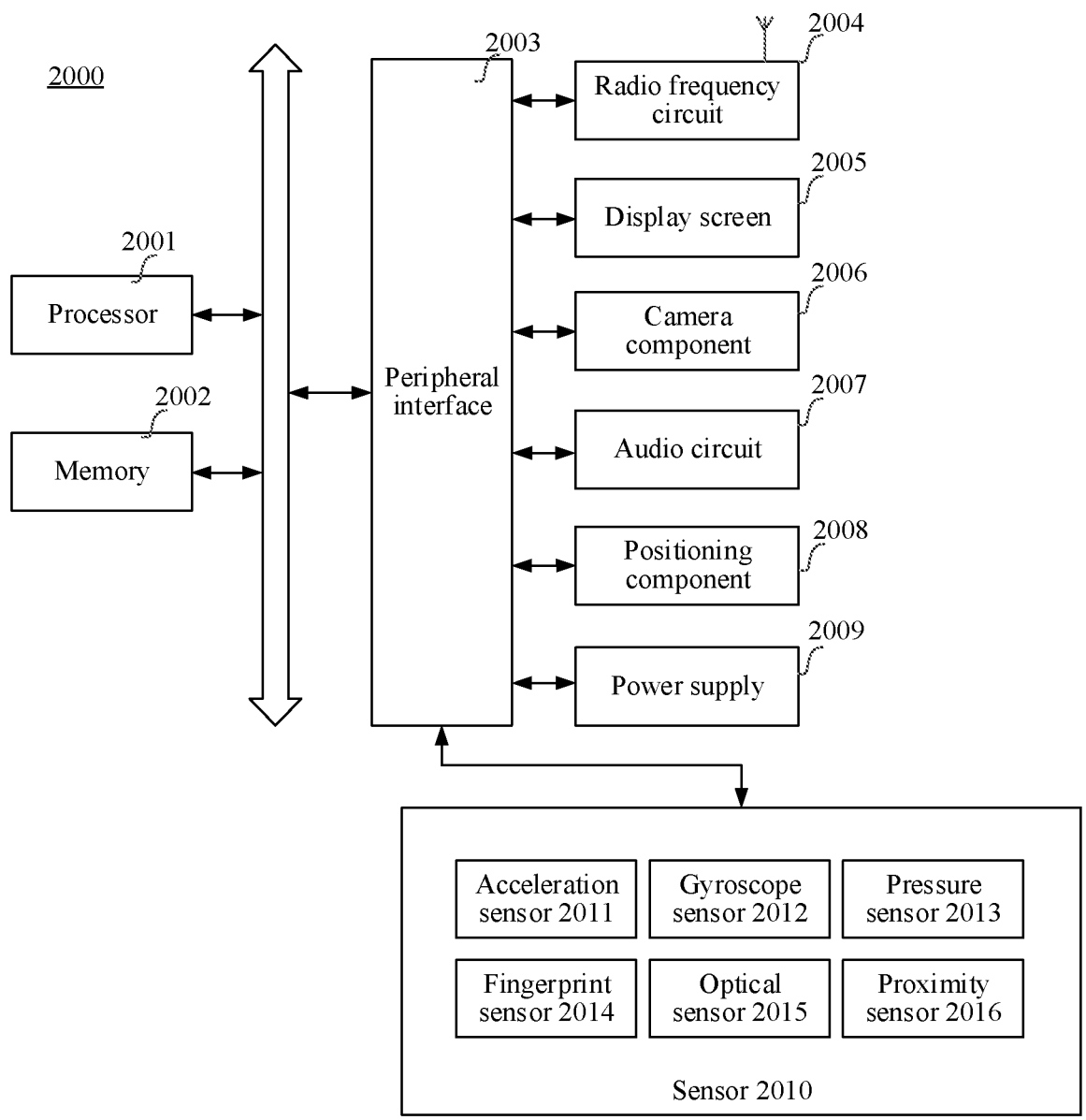
FIG. 20 is a structural block diagram of a terminal according to another exemplary embodiment of this disclosure.

FIG. 20 is a structural block diagram of a terminal 2000 according to an exemplary embodiment of this disclosure. The terminal 2000 may be a smartphone, a tablet computer, a Moving Picture Experts Group Audio Layer III (MP3) player, a Moving Picture Experts Group Audio Layer IV (MP4) player, a notebook computer or a desktop computer. The terminal 2000 may be further referred to as user equipment, a portable terminal, a laptop terminal, a desktop terminal or another name. The terminal 2000 may be the first terminal 120 or the second terminal 160 in FIG. 1.

Usually, the terminal 2000 includes: a processor 2001 and a memory 2002.

The processor 2001 may include one or more processing cores, for example, a 4-core processor or an 8-core processor. The processor 2001 may be implemented in at least one hardware form of a digital signal processor (DSP), a field-programmable gate array (FPGA), and a programmable logic array (PLA). The processor 2001 may alternatively include a main processor and a coprocessor. The main processor is configured to process data in an awake state, also referred to as a central processing unit (CPU); and the coprocessor is a low-power processor configured to process data in a standby state. In some embodiments, the processor 2001 may be integrated with a graphics processing unit (GPU). The GPU is configured to be responsible for rendering and drawing content that a display screen needs to display. In some embodiments, the processor 2001 may further include an artificial intelligence (AI) processor. The AI processor is configured to process a computing operation related to machine learning.

The memory 2002 may include one or more computer-readable storage media. The computer-readable storage medium may be non-transient. The memory 2002 may further include a high-speed random access memory and a non-volatile memory such as one or more magnetic disk storage devices and a flash storage device. In some embodiments, the non-transitory computer-readable storage medium in the memory 2002 is configured to store at least one instruction, and the at least one instruction being configured to be executed by the processor 2001 to implement a method for generating a virtual pet provided in the method embodiments of this application.

In some embodiments, the terminal 2000 further optionally includes a peripheral interface 2003 and at least one peripheral. The processor 2001, the memory 2002, and the peripheral interface 2003 may be connected through a bus or a signal cable. Each peripheral may be connected to the peripheral interface 2003 through a bus, a signal cable, or a circuit board. Specifically, the peripheral includes: at least one of a radio frequency (RF) circuit 2004, a touch display screen 2005, a camera component 2006, an audio circuit 2007, a positioning component 2008, and a power supply 2009.

The peripheral interface 2003 may be configured to connect at least one peripheral related to input/output (I/O) to the processor 2001 and the memory 2002. In some embodiments, the processor 2001, the memory 2002, and the peripheral interface 2003 are integrated into a same chip or circuit board; and in some other embodiments, any one or two of the processor 2001, the memory 2002, and the peripheral interface 2003 may be implemented on an independent chip or circuit board. This is not limited in this embodiment.

The RF circuit 2004 is configured to receive and transmit an RF signal, which is also referred to as an electromagnetic signal. The RF circuit 2004 communicates with a communication network and another communication device by using the electromagnetic signal. The RF circuit 2004 converts an electric signal into an electromagnetic signal for transmission, or converts a received electromagnetic signal into an electric signal. Optionally, the RF circuit 2004 includes: an antenna system, an RF transceiver, one or more amplifiers, a tuner, an oscillator, a digital signal processor, a codec chip set, a subscriber identity module card, and the like. The RF circuit 2004 may communicate with other terminals through at least one wireless communication protocol. The wireless communication protocol includes, but is not limited to: World Wide Web, a metropolitan area network, an intranet, various generations of mobile communication networks (2G, 3G, 4G, and 5G), a wireless local area network and/or a wireless fidelity (Wi-Fi) network. In some embodiments, the RF circuit 2004 may also include a circuit related to near field communication (NFC). This is not limited in this application.

The display screen 2005 is configured to display a user interface (UI). The UI may include a graph, a text, an icon, a video, and any combination thereof. When the display screen 2005 is a touch display screen, the display screen 2005 is further capable of acquiring a touch signal on or above a surface of the display screen 2005. The touch signal may be inputted to the processor 2001 for processing as a control signal. In this case, the display screen 2005 may be further configured to provide a virtual button and/or a virtual keyboard, which is also referred to as a soft button and/or a soft keyboard. In some embodiments, there may be one display screen 2005, disposed on a front panel of the terminal 2000. In some other embodiments, there may be at least two display screens 2005, disposed on different surfaces of the terminal 2000 respectively or in a folded design. In still other embodiments, the display screen 2005 may be a flexible display screen, disposed on a curved surface or a folded surface of the terminal 2000. The display screen 2005 may even be further set in a non-rectangular irregular pattern, namely, a special-shaped screen. The display screen 2005 may be prepared by using a material such as a liquid crystal display (LCD), an organic light-emitting diode (OLED), or the like.

The camera component 2006 is configured to acquire an image or a video. Optionally, the camera component 2006 includes a front-facing camera and a rear-facing camera. Generally, the front-facing camera is disposed on the front panel of the terminal, and the rear-facing camera is disposed on a back face of the terminal. In some embodiments, there are at least two rear-facing cameras, each of which is any one of a main camera, a depth of field camera, a wide-angle camera, and a telephoto camera, to implement a background blurring function by fusing the main camera and the depth of field camera, and panoramic shooting and virtual reality (VR) shooting functions or other fusing shooting functions by fusing the main camera and the wide-angle camera. In some embodiments, the camera component 2006 may further include a flash. The flash may be a single color temperature flash, or may be a double color temperature flash. The double color temperature flash is a combination of a warm light flash and a cold light flash, and may be used for light compensation under different color temperatures.

The audio circuit 2007 may include a microphone and a speaker. The microphone is configured to: acquire sound waves of a user and an environment, and convert the sound waves into electrical signals and input the electrical signals into the processor 2001 for processing, or input the electrical signals into the RF circuit 2004 to implement speech communication. For the purpose of stereo collection or noise reduction, there may be a plurality of microphones, disposed at different parts of the terminal 2000 respectively. The microphone may be further an array microphone or an omnidirectional collection microphone. The speaker is configured to convert electrical signals from the processor 2001 or the RF circuit 2004 into sound waves. The speaker may be a conventional thin-film speaker, or may be a piezoelectric ceramic speaker. When the speaker is the piezoelectric ceramic speaker, electrical signals not only can be converted into sound waves that can be heard by human, but also can be converted into sound waves that cannot be heard by human for ranging and other uses. In some embodiments, the audio circuit 2007 may also include an earphone jack.

The positioning component 2008 is configured to determine a current geographic location of the terminal 2000, to implement navigation or a location based service (LBS). The positioning component 2008 may be a positioning component based on the Global Positioning System (GPS) of the United States, the BeiDou system of China, the Global Navigation Satellite System (GLONASS) of Russia, or the GALILEO System of the European Union.

The power supply 2009 is configured to supply power for various components in the terminal 2000. The power supply 2009 may be an alternating current, a direct current, a disposable battery, or a rechargeable battery. When the power supply 2009 includes a rechargeable battery, the rechargeable battery may be a wired rechargeable battery or a wireless rechargeable battery. The wired rechargeable battery is a battery that is charged by a wired line, and the wireless rechargeable battery is a battery that is charged by a wireless coil. The rechargeable battery may further be configured to support a quick charge technology.

In some embodiments, the terminal 2000 may also include one or more sensors 2010. The one or more sensors 2010 include, but are not limited to: an acceleration sensor 2011, a gyroscope sensor 2012, a pressure sensor 2013, a fingerprint sensor 2014, an optical sensor 2015, and a proximity sensor 2016.

The acceleration sensor 2011 may detect accelerations on three coordinate axes of a coordinate system established by the terminal 2000. For example, the acceleration sensor 2011 may be configured to detect components of the gravity acceleration on the three coordinate axes. The processor 2001 may control, according to a gravity acceleration signal collected by the acceleration sensor 2011, the touch display screen 2005 to display the user interface in a frame view or a portrait view. The acceleration sensor 2011 may be further configured to collect game or user motion data.

The gyroscope sensor 2012 may detect a body direction and a rotation angle of the terminal 2000. The gyroscope sensor 2012 may collaborate with the acceleration sensor 2011 in collecting a 3D action of the user on the terminal 2000. The processor 2001 may implement the following functions according to the data collected by the gyroscope sensor 2012: motion sensing (such as changing the UI according to a tilt operation of the user), image stabilization during shooting, game control, and inertial navigation.

The pressure sensor 2013 may be disposed on a side frame of the terminal 2000 and/or a lower layer of the touch display screen 2005. When the pressure sensor 2013 is disposed on the side frame of the terminal 2000, a holding signal of the user to the terminal 2000 may be detected, and left/right hand identification or a quick action may be performed by the processor 2001 according to the holding signal collected by the pressure sensor 2013. When the pressure sensor 2013 is disposed on the lower layer of the touch display screen 2005, the processor 2001 controls an operable control on the UI interface according to a pressure operation of the user on the touch display screen 2005. The operable control includes at least one of a button control, a scroll bar control, an icon control and a menu control.

The fingerprint sensor 2014 is configured to collect a user's fingerprint, and the processor 2001 identifies a user's identity according to the fingerprint collected by the fingerprint sensor 2014, or the fingerprint sensor 2014 identifies a user's identity according to the collected fingerprint. When the identity of the user is identified as a trusted identity, the processor 2001 authorizes the user to perform a related sensitive operation. The sensitive operation includes unlocking a screen, viewing encryption information, downloading software, payment, changing settings, and the like. The fingerprint sensor 2014 may be disposed on a front face, a back face, or a side face of the terminal 2000. When a physical button or a vendor logo is disposed on the terminal 2000, the fingerprint sensor 2014 may be integrated together with the physical button or the vendor logo.

The optical sensor 2015 is configured to collect ambient light intensity. In an embodiment, the processor 2001 may control the display brightness of the touch display screen 2005 according to the ambient light intensity collected by the optical sensor 2015. Specifically, when the ambient light intensity is relatively high, the display brightness of the touch display screen 2005 is turned up. When the ambient light intensity is relatively low, the display brightness of the touch display screen 2005 is turned down. In another embodiment, the processor 2001 may further dynamically adjust a camera parameter of the camera component 2006 according to the ambient light intensity collected by the optical sensor 2015.

The proximity sensor 2016, also referred to as a distance sensor, is usually disposed on a front panel of the terminal 2000. The proximity sensor 2016 is configured to collect a distance between a user and the front surface of the terminal 2000. In an embodiment, when the proximity sensor 2016 detects that the distance between the user and the front surface of the terminal 2000 gradually decreases, the touch display screen 2005 is controlled by the processor 2001 to switch from a screen-on state to a screen-off state. When the proximity sensor 2016 detects that the distance between the user and the front surface of the terminal 2000 gradually increases, the touch display screen 2005 is controlled by the processor 2001 to switch from the screen-off state to the screen-on state.

A person skilled in the art may understand that the structure shown in FIG. 20 does not constitute a limitation on the terminal 2000, and the terminal may include more or fewer components than those shown in the figure, or some components may be combined, or a different component deployment may be used.

This application further provides a computer-readable storage medium, storing at least one instruction, at least one program, a code set or an instruction set, the at least one instruction, the at least one program, the code set or the instruction set being loaded and executed by a processor to implement a method for breeding a virtual pet provided in the foregoing method embodiments.

Figure 21:
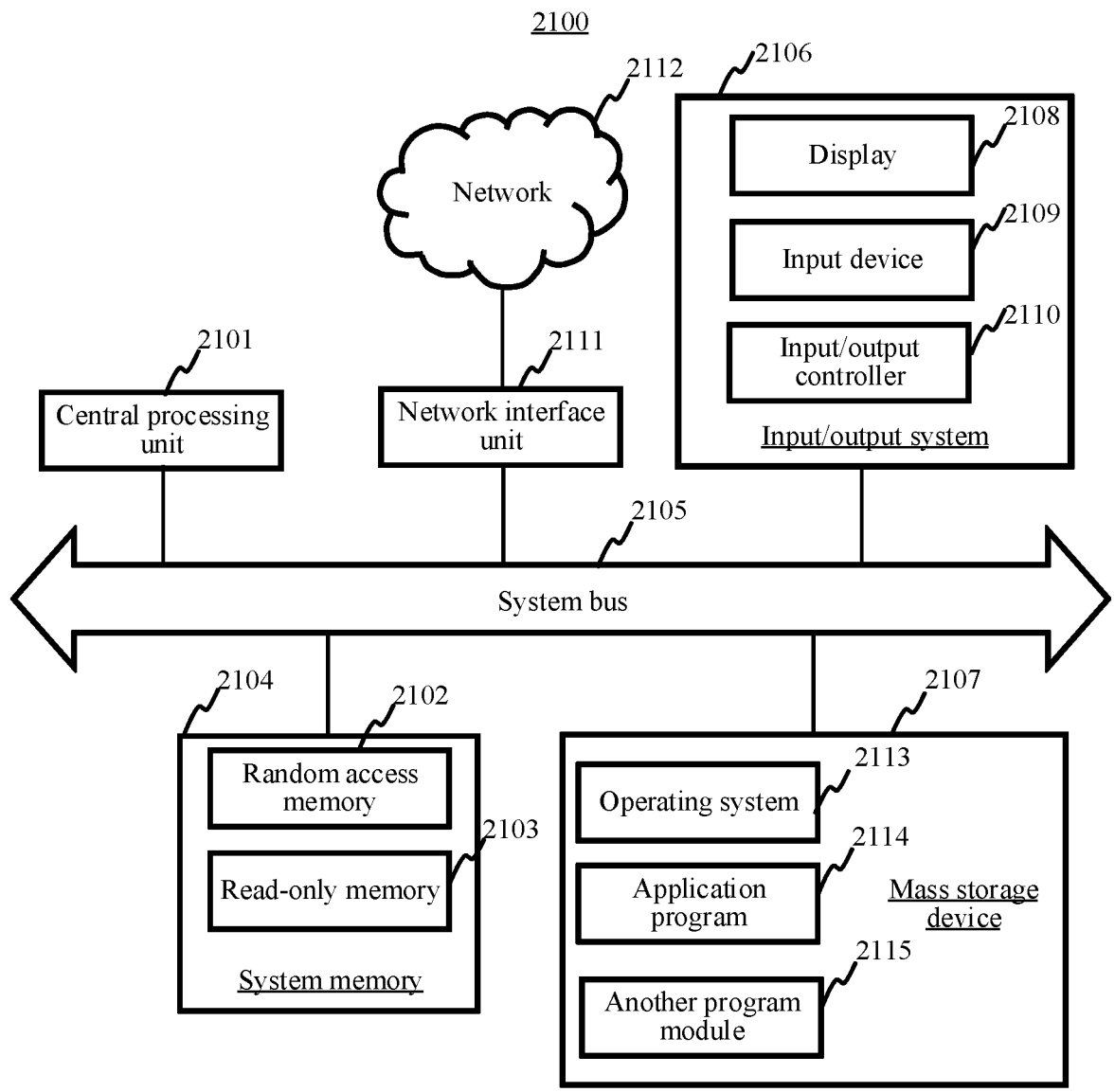
FIG. 21 is a structural block diagram of a server according to another exemplary embodiment of this disclosure.

FIG. 21 is a schematic structural diagram of a server according to an embodiment of this disclosure. Specifically, the server 2100 includes a Central Processing Unit (CPU) 2101, a system memory 2104 including a random access memory (RAM) 2102 and a read-only memory (ROM) 2103, and a system bus 2105 connecting the system memory 2104 and the CPU 2101. The server 2100 further includes a basic input/output system (I/O system) 2106 assisting in transmitting information between devices in a computer, and a mass storage device 2107 configured to store an operating system 2113, a client 2114 and another program module 2115.

The basic I/O system 2106 includes a display 2108 configured to display information and an input device 2109, such as a mouse or a keyboard, configured to input information for a user. The display 2108 and the input device 2109 are both connected to the CPU 2101 by using an input/output controller 2110 connected to the system bus 2105. The basic I/O system 2106 may further include the input/output controller 2110 to be configured to receive and process inputs from multiple other devices such as a keyboard, a mouse, and an electronic stylus. Similarly, the input/output controller 2110 further provides an output to a display screen, a printer or another type of output device.

The mass storage device 2107 is connected to the CPU 2105 by using a mass storage controller (not shown) connected to the system bus 2101. The mass storage device 2107 and its associated computer readable medium provide non-volatile storage for the server 2100. That is, the mass storage device 2107 may include a computer-readable medium (not shown) such as a hard disk or a compact disc ROM (CD-ROM) drive.

Without loss of generality, the computer readable medium may include a computer storage medium and a communications medium. The computer storage medium includes volatile and non-volatile media, and removable and non-removable media implemented by using any method or technology and configured to store information such as a computer-readable instruction, a data structure, a program module, or other data. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a tape cartridge, a magnetic cassette, a magnetic disk memory, or another magnetic storage device. Certainly, a person skilled in art can learn that the computer storage medium is not limited to the foregoing several types. The system memory 2104 and the mass storage device 2107 may be collectively referred to as a memory.

According to various embodiments of this application, the server 2100 may further be connected, by using a network such as the Internet, to a remote computer on the network and run. That is, the server 2100 may be connected to a network 2112 by using a network interface unit 2111 connected to the system bus 2105, or may be connected to another type of network or remote computer system (not shown) by using the network interface unit 2111.

This application further provides a computer program product, the computer program product, when run on an electronic device, causing the electronic device to perform the method for breeding a virtual pet in the foregoing method embodiments.

A person of ordinary skill in the art may understand that all or part of the steps of the embodiments may be implemented by hardware or a computer-readable instruction instructing related hardware. The computer-readable instruction may be stored in a computer-readable storage medium. The storage medium may include a read-only memory, a magnetic disk, or an optical disc.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A method for breeding a virtual pet, performed by a terminal, the terminal being provided with virtual pets, and at least one pet image of each of the virtual pets being generated based on a genetic rule, the method comprising:
   displaying a mating market interface, the mating market interface comprising virtual pets in a mating state;
   selecting a paternal virtual pet from the virtual pets in the mating state via the mating market interface according to a first operation;
   displaying a pet breeding interface, the pet breeding interface comprising a paternal pet field and a maternal pet field, the paternal virtual pet being displayed in the paternal pet field, the paternal virtual pet being a virtual pet provided by a first user account on a mating market, and the paternal virtual pet having a first pet image;
   adding a maternal virtual pet to the maternal pet field according to a second operation, the maternal virtual pet being a virtual pet owned by a second user account logging in to the terminal, and the maternal virtual pet having a second pet image; and
   displaying a breeding result interface comprising a filial virtual pet when breeding succeeds by:
   displaying a collection interface of the filial virtual pet if a breeding duration exceeds a pregnancy duration of the maternal virtual pet;

receiving a collection signal triggered on the collection interface; and displaying the breeding result interface according to the collection signal, a third pet image of the filial virtual pet being displayed on the breeding result interface, where the filial virtual pet having a third pet image generated based on a genetic inheritance rule according to the first pet image and the second pet image.

2. The method according to claim 1, wherein selecting the paternal virtual pet comprises:

receiving the first operation on the mating market interface;

determining a candidate virtual pet from the virtual pets in the mating state according to the first operation;

displaying a pet display interface of the candidate virtual pet, the pet display interface comprising a mating button;

receiving a triggering operation of activating the mating button; and determining the candidate virtual pet as the paternal virtual pet according to the triggering operation.

3. The method according to claim 1, wherein adding a maternal virtual pet to the maternal pet field according to the second operation comprises:

receiving the second operation of activating the maternal pet field;

displaying a pet selection interface comprising at least one virtual pet owned by the second user account;

receiving a selection operation on the pet selection interface;

determining the maternal virtual pet from the at least one virtual pet according to the selection operation; and adding the maternal virtual pet to the maternal pet field.

4. The method according to claim 1, further comprising:

displaying, when the second user account does not own a breeding house prop, a purchase interface used for purchasing the breeding house prop, the breeding house prop being a prop used for providing a breeding place to the paternal virtual pet and the maternal virtual pet;

receiving a purchase signal triggered on the purchase interface; and purchasing the breeding house prop from a server according to the purchase signal.

5. The method according to claim 1, wherein the genetic inheritance rule comprises at least one of: a heredity rule, a mutation rule, or a loss rule; and wherein:

the heredity rule comprises that all or part of image materials of the third pet image of the filial virtual pet are replicated from the first pet image and/or the second pet image;

the mutation rule comprises that the third pet image of the filial virtual pet comprises image materials obtained through mutation, and the image materials obtained through mutation are image materials that neither the first pet image nor the second pet image has; and the loss rule comprises that when the first pet image or the second pet image has an image material with a global feature, the third pet image does not have the image material with the global feature, and the image material with the global feature is an image material covering a body model of a virtual pet representing the virtual pet as a whole and has a highest display priority.

6. The method according to claim 1, further comprising:

transmitting a breeding request to a server, the breeding request comprising information about the paternal virtual pet and the maternal virtual pet; and receiving a breeding response from the server, the breeding response comprising information about the filial virtual pet.

7. The method according to claim 6, the breeding response comprising an image parameter of the filial virtual pet, wherein the image parameter comprises at least one of:

a 3D body model;
an ear model;
a skin material;
an eye material;
a nose material;
a mouth material;
a beard material;
a body speckle material; or
a chest and abdomen pattern material.

8. An apparatus for breeding a virtual pet, the apparatus being provided with virtual pets, and at least one pet image of each of the virtual pets being generated based on a genetic inheritance rule, the apparatus further comprising a memory for storing computer instructions and a processor in communication with the memory, wherein, when the processor executes the instructions, the processor is configured to cause the apparatus to:

display a mating market interface, the mating market interface comprising virtual pets in a mating state;

select a paternal virtual pet from the virtual pets in the mating state via the mating market interface according to a first operation;

display a pet breeding interface, the pet breeding interface comprising a paternal pet field and a maternal pet field, the paternal virtual pet being displayed in the paternal pet field, the paternal virtual pet being a virtual pet provided by a first user account on a mating market, and the paternal virtual pet having a first pet image;

add a maternal virtual pet to the maternal pet field according to a second operation, the maternal virtual pet being a virtual pet owned by a second user account logging in to the apparatus, and the maternal virtual pet having a second pet image; and display a breeding result interface comprising a filial virtual pet when breeding succeeds by:

display a collection interface of the filial virtual pet if a breeding duration exceeds a pregnancy duration of the maternal virtual pet;

receive a collection signal triggered on the collection interface; and display the breeding result interface according to the collection signal, a third pet image of the filial virtual pet being displayed on the breeding result interface, wherein the filial virtual pet having a third pet image generated based on the genetic inheritance rule according to the first pet image and the second pet image.

9. The apparatus according to claim 8, wherein, when the processor is configured to cause the apparatus to select the paternal virtual pet, the processor is configured to cause the apparatus to:

receive the first operation on the mating market interface;

determine a candidate virtual pet from the virtual pets in the mating state according to the first operation;

display a pet display interface of the candidate virtual pet, the pet display interface comprising a mating button;

receive a triggering operation of activating the mating button; and determine the candidate virtual pet as the paternal virtual pet according to the triggering operation.

10. The apparatus according to claim 8, wherein, when the processor is configured to cause the apparatus to add a maternal virtual pet to the maternal pet field according to the second operation, the processor is configured to cause the apparatus to:
 receive the second operation of activating the maternal pet field;
 display a pet selection interface comprising at least one virtual pet owned by the second user account;
 receive a selection operation on the pet selection interface;
 determine the maternal virtual pet from the at least one virtual pet according to the selection operation; and
 add the maternal virtual pet to the maternal pet field.

11. The apparatus according to claim 8, wherein, when the processor executes the instructions, the processor is configured to further cause the apparatus to:
 display, when the second user account does not own a breeding house prop, a purchase interface used for purchasing the breeding house prop, the breeding house prop being a prop used for providing a breeding place to the paternal virtual pet and the maternal virtual pet;
 receive a purchase signal triggered on the purchase interface; and
 purchase the breeding house prop from a server according to the purchase signal.

12. The apparatus according to claim 8, wherein the genetic inheritance rule comprises at least one of: a heredity rule, a mutation rule, or a loss rule; and
 wherein:
  the heredity rule comprises that all or part of image materials of the third pet image of the filial virtual pet are replicated from the first pet image and/or the second pet image;
  the mutation rule comprises that the third pet image of the filial virtual pet comprises image materials obtained through mutation, and the image materials obtained through mutation are image materials that neither the first pet image nor the second pet image has; and
  the loss rule comprises that when the first pet image or the second pet image has an image material with a global feature, the third pet image does not have the image material with the global feature, and the image material with the global feature is an image material covering a body model of a virtual pet representing the virtual pet as a whole and has a highest display priority.

13. The apparatus according to claim 8, wherein, when the processor executes the instructions, the processor is configured to further cause the apparatus to:
 transmit a breeding request to a server, the breeding request comprising information about the paternal virtual pet and the maternal virtual pet; and
 receive a breeding response from the server, the breeding response comprising information about the filial virtual pet.

14. The apparatus according to claim 13, the breeding response comprising an image parameter of the filial virtual pet, wherein the image parameter comprises at least one of:
 a 3D body model;
 an ear model;
 a skin material;
 an eye material;
 a nose material;
 a mouth material;
 a beard material;
 a body speckle material; or
 a chest and abdomen pattern material.

* * * * *